United States Patent
Beutel et al.

(10) Patent No.: US 12,064,752 B2
(45) Date of Patent: Aug. 20, 2024

(54) MESOPOROUS CATALYST COMPOUNDS AND USES THEREOF

(71) Applicant: ExxonMobil Technology and Engineering Company, Annandale, NJ (US)

(72) Inventors: Tilman W. Beutel, Neshanic Station, NJ (US); Gerardo J. Majano Sanchez, Basking Ridge, NJ (US); Walter Weissman, Basking Ridge, NJ (US); Brian M. Weiss, Bridgewater, NJ (US); Himanshu Gupta, Lebanon, NJ (US); John F. Brody, Bound Brook, NJ (US); Scott J. Weigel, Allentown, PA (US)

(73) Assignee: ExxonMobil Technology and Engineering Company, Annandale, NJ (US)

(*) Notice: Subject to any disclaimer, the term of this patent is extended or adjusted under 35 U.S.C. 154(b) by 136 days.

(21) Appl. No.: 17/430,758

(22) PCT Filed: Jan. 22, 2020

(86) PCT No.: PCT/US2020/014539
§ 371 (c)(1),
(2) Date: Aug. 13, 2021

(87) PCT Pub. No.: WO2020/190367
PCT Pub. Date: Sep. 24, 2020

(65) Prior Publication Data
US 2022/0143586 A1 May 12, 2022

Related U.S. Application Data

(60) Provisional application No. 62/819,815, filed on Mar. 18, 2019.

(51) Int. Cl.
*B01J 29/70* (2006.01)
*B01J 35/30* (2024.01)
(Continued)

(52) U.S. Cl.
CPC ........... *B01J 29/7088* (2013.01); *B01J 35/30* (2024.01); *B01J 35/617* (2024.01); *B01J 35/633* (2024.01);
(Continued)

(58) Field of Classification Search
CPC ..... C10G 11/05; C10G 35/095; C01B 39/026; C01B 39/48; C01P 2006/12;
(Continued)

(56) References Cited

U.S. PATENT DOCUMENTS 6,049,018 A * 4/2000 Calabro ................ C07C 5/2708
585/475
7,198,711 B1 * 4/2007 Chester ................ C07D 487/08
585/446

(Continued)

OTHER PUBLICATIONS

Shinya Hodoshima et al., "Catalytic conversion of light hydrocarbons to propyle over MFI-zeolite/metal-oxide composites", Microporous and Mesoporous Matertials, 2016, pp. 125-132.

*Primary Examiner* — Colin W. Slifka

(57) ABSTRACT

The present disclosure provides mesoporous catalyst compounds and compositions having one or more group 13 atoms. The present disclosure further relates to processes for converting hydrocarbon feedstocks to small olefins. In one aspect, a catalyst compound includes a zeolite having a structural type selected from MFI, MSE, MTW, Theta-One (TON), Ferrierite (FER), AFI, AFS, ATO, BEA, BEC, BOG, BPH, CAN, CON, EMT, EON, EZT, FAU, GME, GON, IFR, ISV, ITN, IWR, IWW, LTL, MAZ, MEI, MOR, MOZ, OFF, OKO, OSI, SAF, SAO, SEW, SFE, SFO, SSF, SSY, and USI, or a combination thereof, the zeolite having a (Continued)

silicon to aluminum molar ratio (Si/Al ratio) of from about 5 to about 40. In one aspect, a catalyst composition includes the catalyst compound and one or more group 13 metal.

15 Claims, 8 Drawing Sheets

(51) Int. Cl.
 *B01J 35/61* (2024.01)
 *B01J 35/63* (2024.01)
 *B01J 37/02* (2006.01)
(52) U.S. Cl.
 CPC ......... *B01J 35/635* (2024.01); *B01J 37/0215* (2013.01); *B01J 2229/62* (2013.01)
(58) Field of Classification Search
 CPC .. C01P 2006/14; B01J 37/0215; B01J 35/002; B01J 35/1023; B01J 35/1038; B01J 35/1042; B01J 35/1057; B01J 35/1061; B01J 35/109; B01J 29/70; B01J 29/7049; B01J 29/7088; B01J 29/655; B01J 29/65; B01J 29/40; B01J 29/405; B01J 29/08; B01J 29/085; B01J 29/061; B01J 29/041; B01J 2229/14; B01J 2229/16; B01J 2229/186; B01J 2229/36; B01J 2229/37; B01J 2229/38; B01J 2229/42; B01J 2229/62
 USPC .......................................... 502/60, 61, 73, 79
 See application file for complete search history.

(56) References Cited

U.S. PATENT DOCUMENTS

| | | | |
|---|---|---|---|
| 7,976,696 B2* | 7/2011 | Ying | B01J 29/005 208/119 |
| 10,717,069 B2 | 7/2020 | Weiss et al. | |
| 2014/0140921 A1* | 5/2014 | Burton | C01B 39/48 423/703 |
| 2018/0169623 A1 | 6/2018 | Weiss et al. | |
| 2019/0002767 A1 | 1/2019 | Dries | |
| 2020/0018268 A1 | 1/2020 | Merchant et al. | |

* cited by examiner

MESOPOROUS CATALYST COMPOUNDS AND USES THEREOF

CROSS-REFERENCE TO RELATED APPLICATIONS

This application is a national stage application under 35 USC 371 of International Application No. PCT/US2020/014539 filed on Jan. 22, 2020, which claimed the benefit of U.S. Provisional Patent Application No. 62/819,815, filed Mar. 18, 2019.

The present disclosure provides mesoporous catalyst compounds and compositions having one or more group 13 atoms. The present disclosure further relates to processes for converting hydrocarbon feedstocks to small olefins.

BACKGROUND

Current global rising demand for propylene in the petrochemical industry has prompted the development of new technology to improve its production. The majority of propylene (ca. 60%) is currently produced by a variety of processes including a steam-cracking process of propane, a dehydrogenation process of propane (UOP Oleflex™ propane dehydrogenation process), a Methanol-to-Olefin (MTO) process, or as a by-product of a thermal steam-cracking process of hydrocarbon feedstock such as naphtha.

However, further improvements to propylene production are needed, and the current processes can no longer meet the current propylene demand. For example, the current processes typically involve high thermal energy (e.g., high temperature of from about 800° C. to about 950° C., e.g., propane and naphtha steam-cracking at >800° C.), and these processes provide a low weight ratio of propylene to ethylene (ca. 0.5). Steam crackers operate at a temperature >800° C. providing high yields of light olefins (e.g., ethylene and propylene; ca. 50 wt % in products). In addition, steam cracking of naphtha and C5 to C7 paraffins produces significant amounts of methane (ca. 10 wt % in products).

Furthermore, the MTO process is multi-stepped, costly, and energy intensive due to the formation of syngas from Natural Gas (NG) and naphtha by steam-reforming or coal gasification. Also, the propane dehydrogenation processes are limited to Liquefied Petroleum Gas (LPG) feed. More diverse feeds, such as aromatics and paraffin mixtures, can be used for naphtha steam-cracking. Nonetheless, significant amounts of methane are formed. Additionally, linear or mildly branched C4-C7 paraffins, such as pentane, can be reacted which have low octane which makes them difficult to use in gasoline, and the high vapor pressure of pentane limits its use in transportation fuels.

In addition, recent interest in ethane-based feedstock for producing ethylene may also have an impact on the propylene supply, as such technology produces a limited amount of propylene. Moreover, conversion of various light hydrocarbons (e.g., shale oil, condensates recovered from shale gas and olefinic hydrocarbons obtained from Gas-To-Liquids (GTL) process) into valuable light olefins has also been a challenge in terms of efficient use of resources.

Processes to produce olefins from naphtha-based feedstocks include catalytic processes that convert paraffins by catalytic dehydrogenation and cracking, as well as non-catalytic thermal routes. Catalytic cracking of hydrocarbons such as naphtha over solid acid catalysts, e.g., ZSM-5, has been proposed as an alternative method for on-purpose propylene production to conventional thermal steam-cracking. When compared to a steam-cracking process, the advantages of using catalytic cracking on a fixed-bed reactor include the high selectivity to propylene (weight ratio of propylene to ethylene >2.0) and energy savings due to low temperatures (<650° C.). Furthermore, the cracking process in fixed-bed mode is superior to fluidized catalytic cracking (FCC) processes in terms of operational simplicity in the reaction unit. Yet, commercialization of the catalytic cracking process using a fixed-bed reactor has not been achieved because of the need for developing an efficient and practical cracking catalyst having excellent stability, applicable to fixed-bed reactors. For example, a fixed bed catalytic process producing propylene at 400° C. to 650° C. using individual dehydrogenation and cracking catalysts from mixtures of hexane and heptane, as well as gasoline, has been developed using a Cr-based or a Pt-based catalyst for dehydrogenation and acidic zeolites or silica-alumina-phosphorus mixed oxides for cracking. However, selectivity to propylene in this process is low (5%-10% selectivity).

Therefore, there is a need for processes to produce propylene efficiently from naphtha (a widely available feedstock) in order to meet the demand for propylene and reduce energy-consumption in olefin production processes. For example, there is a need for a highly active and stable catalyst for the fixed-bed-type cracking of light hydrocarbons to produce propylene efficiently under mild conditions, such as a catalyst that could be used in the upgrading of NG liquids containing C4-C7 paraffins.

SUMMARY

The present disclosure provides mesoporous catalyst compounds and compositions having one or more group 13 atoms. The present disclosure further relates to processes for converting hydrocarbon feedstocks to small olefins. In at least one embodiment, a catalyst composition includes a catalyst compound and one or more group 13 metal.

In one aspect, a catalyst compound includes a large pore zeolite having AFI, AFS, ATO, BEA, BEC, BOG, BPH, CAN, CON, EMT, EON, EZT, FAU, GME, GON, IFR, ISV, ITN, IWR, IWW, LTL, MAZ, MEI, MOR, MOZ, MSE, MTW, OFF, OKO, OSI, SAF, SAO, SEW, SFE, SFO, SSF, SSY, and USI frameworks, or a combination thereof. In at least one embodiment, the zeolite is MCM-68 or UZM-35 (MSE structure type). The silicon to aluminum molar ratio (Si/Al ratio) of the zeolite ranges from about 8 to about 30.

In another aspect, a catalyst compound includes a medium pore zeolite having MFI (e.g., ZSM-5, FeS-1, MnS-1, Mutinaite, Encilite, AZ-1, ZBH, ZKQ-1B, TS-1, Boralite C, Silicalite, AMS-1B, USC-4, ZMQ-TB, USI-108, NU-5, ZBH, TSZ-III), MTT structure type (e.g. ZSM-23) or MRE structure type (e.g. ZSM-48) or a combination thereof.

In a further aspect, a process for producing C2-C4 olefins includes dehydrocracking a C3-C7 hydrocarbon feedstock by contacting the C3-C7 hydrocarbon feedstock with one or more catalyst composition, in one or more reactors, in series or in parallel, at a reactor pressure of atmospheric pressure and a reactor temperature of from 400° C. to 600° C., and a weight hourly space velocity (WHSV) of from about 50 h-1 to about 800 h-1 to form C2-C4 olefins.

DETAILED DESCRIPTION

Figure 1:
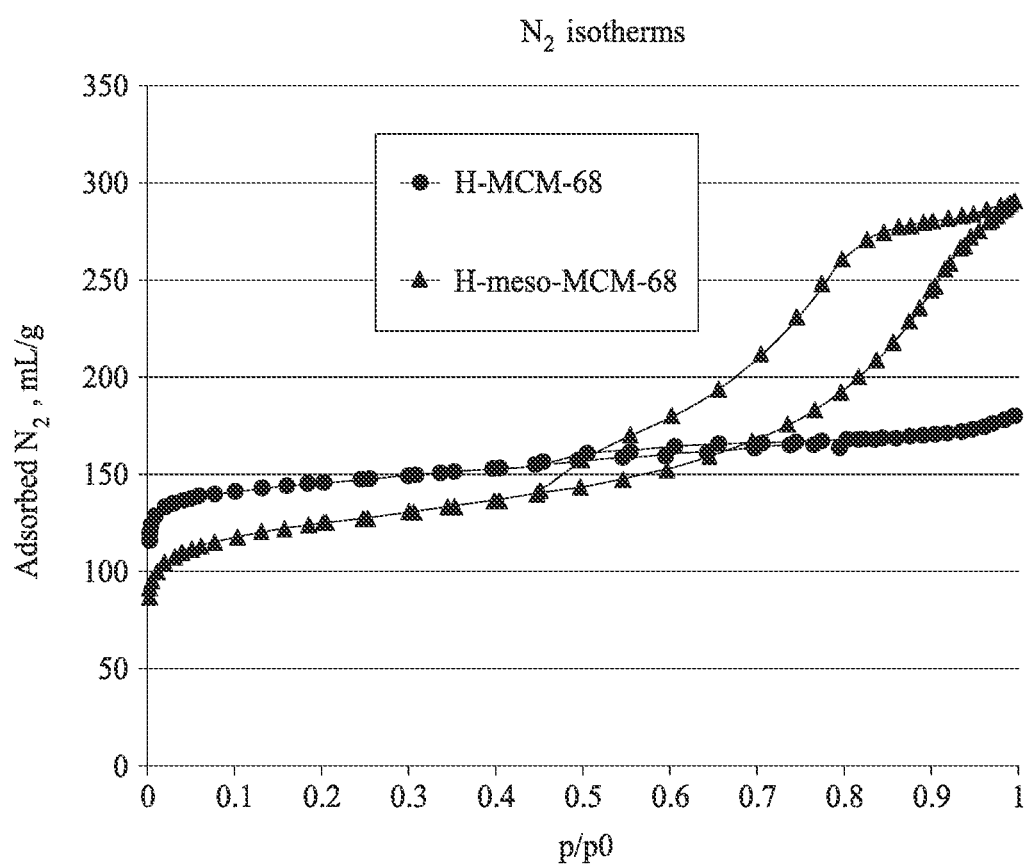
FIG. 1 is a graph illustrating the N2-BET isotherm measurements for H-MCM-68 and mesoporous H-MCM-68, according to one embodiment.

The present disclosure provides mesoporous zeolite-based catalyst compositions including one or more mesoporous zeolite(s) (e.g., mesoporous MCM-68) having one or more group 13 atoms (e.g., Gallium) disposed with the mesoporous zeolite (e.g., a mesoporous zeolite impregnated with one or more group 13 atoms). In at least one embodiment, a mesoporous zeolite-based catalyst composition includes a zeolite configured to perform a dehydrogenation function and an acid-based cracking function. The mesoporous zeolite-based catalyst compositions may include one or more group 13 atoms (e.g., Ga-meso-MCM 68) at a ratio of zeolite and group 13 atoms, and the compositions optionally include a binder (such as a metal oxide support material).

The present disclosure further relates to processes for converting C3-C7 hydrocarbon feedstocks (e.g., lower value naphtha paraffins such as light-naphtha; olefinic hydrocarbons from a GTL-process; condensates from NG, any other any suitable fuel oil), to small olefins (e.g., ethylene and/or propylene) for fuel upgrading, using a dehydrocracking process. As used herein, a dehydrocracking process is a combination of one or more dehydrogenation process(es), and one or more cracking process(es). Processes for converting hydrocarbon feedstocks to small olefins may include dehydrocracking a hydrocarbon feedstock, such as n-hexane, by contacting one or more mesoporous zeolite-based catalyst compositions, to provide C1-C5 products including C2-C5 olefins, such as C2-C4 olefins (e.g., propylene) and hydrogen. A dehydrocracking process may be operated in a plug flow reactor, fixed-bed-type reactor, a reactor including a continuous catalyst regeneration system, or a fluidized bed reactor at mild temperatures, or a moving bed reactor (e.g., from about 400° C. to about 600° C.).

For example, in a fluidized bed reactor, the conversion process can be carried out at a catalyst/fuel oil ratio of from about 6 to about 20, such as from about 7 to about 18, such as from about 8 to about 16; and/or at a residence time of from about 0.5 seconds to about 300 hours, such as from about 1 hour to about 250 hours, such as from about 2 hours to about 200 hours, such as from about 24 hours to about 96 hours, alternatively from about 4 minutes to about 25 minutes, alternatively about 1 second to about 5 seconds. In a fixed bed reactor, the conversion process can be carried out at a weight hourly space velocity (WHSV) of from about 50 h-1 to about 800 h-1, such as from about 200 h-1 to about 650 h-1.

For example, a mesoporous zeolite-based catalyst composition may include a mesoporous MCM-68 zeolite and Ga, also referred to as "Ga-meso-MCM-68" catalyst. Under reaction conditions, the Ga-meso-MCM-68 catalyst can achieve the conversion of n-hexane into propylene and hydrogen, with reduced or eliminated formation of methane (e.g., about 7 mol % or less), propane (e.g., about 7 mol %, or less). The conversion of n-hexane into propylene and hydrogen can be achieved under mild conditions, such as: at a temperature of about 600° C. or less, such as from about 400° C. to about 600° C. (e.g., about 540° C.); at atmospheric pressure; and/or a WHSV of from about 50 h-1 to about 800 h-1, such as from about 200 h-1 to about 650 h-1.

In an alternate embodiment, a mesoporous zeolite-based catalyst composition can be a hydrogenated form of a zeolite, such as mesoporous H-MCM-68, but having mesopores, which is referred to herein as "H-meso-MCM-68" catalyst. A process using an H-meso-MCM-68 catalyst can achieve a conversion of n-hexane into C1-C5 products including C2-C5 olefins (e.g., propylene), and hydrogen, with reduced or eliminated: formation of methane (e.g., about 6 mol % or less), propane (e.g., about 7 mol % or less). The conversion of n-hexane into C1-C5 products, e.g. products including C2-C4 olefins (e.g., propylene), can be achieved under mild conditions, such as: at a temperature of about 600° C. or less, such as from about 400° C. to about 600° C. (e.g., 538° C.); at atmospheric pressure; and/or a weight hourly space velocity (WHSV) of from about 50 h-1 to about 800 h-1, such as from about 200 h-1 to about 650 h-1.

Catalyst compositions and processes of the present disclosure can provide one or more of: (e.g., average propylene selectivity of about 50 mol %); a conversion of from about 5% to about 25% conversion; average coke deactivation rate constant (e.g., Alpha deactivation rate constant of the coke resistance of the catalyst) of from about 0 to about 0.2 (e.g., 0.08); and/or an average molar ratios of olefin/paraffins of from about 10:1 to about 0.5 (e.g., propylene/propane of about 7.2). In at least one embodiment, catalyst compositions and processes of the present disclosure provide production of C2-C5 olefins, such as C2-C4 olefins with high selectivity towards propylene, when the acidic cracking function of the mesoporous MCM-68 zeolite is combined with the dehydrogenation function of Ga. Furthermore, in comparison to typical cracking catalysts, the mesoporous zeolite-based catalyst composition (e.g., Ga-meso-MCM-68 catalyst) can: i) reduce the deactivation rate of the catalyst by coke formation to a level comparable with the non-mesoporous H-MCM-68 (non-mesoporous acid form of MCM-68 zeolite), while maintaining high propylene selectivity; ii) lower the ethylene selectivity which results in a higher propylene/ethylene ratio; and/or iii) lower coke formation which enables longer cycle times before regeneration of the catalyst. Hence, paraffins can be dehydrogenated to hydrogen and olefins, which can be subsequently cracked over the acid sites into smaller olefins (predominantly propylene). Such hydrogenation of the intermediate olefins can be minimized by fast consecutive conversion of the intermediate olefins via acid cracking functions and processes. Catalysts of the present disclosure having the combination of a dehydrogenation function and an acid cracking function can provide the non-equilibrium olefin/paraffin molar ratios in the product stream.

For the purposes of the present disclosure, the numbering scheme for the Periodic Table Groups is used as described in Chemical and Engineering News, 63(5), pg. 27 (1985). Therefore, a "group 13 metal" is an element from group 13 of the Periodic Table, e.g., Al, Ga, or In.

Ambient temperature is 23° C., unless otherwise indicated.

An "olefin," alternatively referred to as "alkene," is a linear, branched, or cyclic compound of carbon and hydrogen having at least one double bond.

The term "alkyl" includes C1-C100 alkyl that may be linear, branched, or cyclic. Examples of alkyl can include methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, including their substituted analogues.

The term "olefinicity" refers to the molar ratio of the sum of olefins to the sum of paraffins detected. The olefinicity increases when the olefin/paraffin molar ratio increases. The olefinicity decreases when the olefin/paraffin molar ratio decreases.

For purposes of the present disclosure and claims thereto, the term "substituted" means that a hydrogen atom has been replaced with a non-hydrogen atom, for example, carbon, a heteroatom such as nitrogen, sulfur, oxygen, or halogen, or a heteroatom containing group. For example, a heteroatom can be nitrogen, sulfur, oxygen, halogen, etc.

In the description herein, the catalyst may be described as a catalyst precursor, a pre-catalyst compound, or a catalyst compound, and these terms are used interchangeably.

The term "conversion" refers to the degree to which the reactants in a particular reaction (e.g., dehydrogenating, cracking, dehydration, coupling, etc.) are converted to products. Thus 100% conversion refers to complete consumption of reactants, and 0% conversion refers to no reaction. Conversion of a hydrocarbon feed should be understood to be calculated solely by the ratio of the difference between the mass (or number of moles) of hydrocarbon component of the feed entering the inlet of the dehydrocracking zone and the mass (or number of moles) of hydrocarbon component exiting the outlet of the dehydrocracking zone, divided by the mass (or number of moles) of hydrocarbon component of the feed entering the inlet of the dehydrocracking zone, and is reported as percent conversion (%).

The term "zeolite" refers to a crystalline material having a porous framework structure built from tetrahedral atoms connected by bridging oxygen atoms, such as a crystalline molecular sieves framework. Examples of known zeolite frameworks are given in the "Atlas of Zeolite Frameworks" published on behalf of the Structure Commission of the International Zeolite Association", 6th revised edition, Ch. Baerlocher, L. B. McCusker, D. H. Olson, eds., Elsevier, New York (2007). A zeolite can refer to aluminosilicates having a zeolitic framework type, as well as crystalline structures containing oxides of heteroatoms different from silicon and aluminum. Such heteroatoms can include any suitable heteroatom for inclusion in a zeolitic framework, such as gallium, boron, germanium, phosphorus, zinc, and/or other transition metals that can substitute for silicon and/or aluminum in a zeolitic framework. The zeolite is generally subjected to activation in order to perform their dehydrocracking function using temperature, thus by heating the molecular sieve at a temperature from about 200° C. to about 800° C. for an appropriate period of time in the presence of an oxygen containing gas.

As used herein, and unless otherwise specified, the term "large pore zeolite" means a zeolite having a plurality of pores that have a 12-membered ring. For example, a pore of a large pore zeolite of the present disclosure can be a 12-membered ring aperture formed with 12 atoms (e.g., 12 atoms of Si and/or Al forming a 12-membered ring). The term "medium pore zeolite" means a zeolite having a plurality of pores that have a 10-membered ring. The term "small pore zeolite" means a zeolite having a plurality of pores that have an 8-membered ring.

The terms "group" and "moiety" may be used interchangeably.

As used herein, and unless otherwise specified, the term "Cn" means hydrocarbon(s) having n carbon atom(s) per molecule, wherein n is a positive integer.

As used herein, and unless otherwise specified, the term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n.

The present disclosure further relates to processes for converting C3-C7 hydrocarbon feedstocks to small olefins (e.g., propylene) via a dehydrocracking process. In at least one embodiment, the dehydrocracking process is carried out by contacting a dehydrocracking catalyst with a C3-C7 hydrocarbon feedstock, where the dehydrocracking catalyst has a mesoporous zeolite-based catalyst composition including a mesoporous zeolite (acid-based cracking function) and a group 13 atom (dehydrogenation function).

The hydrocarbon feedstock to be cracked may include, in whole or in part, a gas oil (e.g., light, medium, or heavy gas oil) having an initial boiling point above 204° C., a 50% point of at least 260° C. and an end point of at least 315° C. The feedstock may also include vacuum gas oils, thermal oils, residual oils, cycle stocks, whole top crudes, tar sand oils, shale oils, synthetic fuels, heavy hydrocarbon fractions derived from the destructive hydrogenation of coal, tar, pitches, asphalts, hydrotreated feedstocks. The distillation of higher boiling petroleum fractions above 400° C. can be carried out under vacuum in order to avoid thermal cracking. The boiling temperatures utilized herein are expressed for convenience in terms of the boiling point corrected to atmospheric pressure. Resids or deeper cut gas oils with high metals contents can also be cracked using a process of the present disclosure.

First Catalytic Component of the Catalytic Composition: Cracking Component.

In at least one embodiment, the catalytic composition includes a catalyst that comprises one or more zeolites. During a process of the present disclosure, the zeolites can provide cracking activity. For purpose of the present disclosure, the zeolitic component can be a large pore zeolite (largest window having a 12-membered ring aperture), a medium pore zeolite (largest window having a 10-membered ring aperture), or a small pore zeolite (largest window having a 8-membered ring aperture), and/or a mixture thereof, which may include a porous, crystalline aluminosilicate structure.

Examples of medium pore zeolites may include the MFI structural type (e.g., ZSM-5, FeS-1, MnS-1, Mutinaite, [As—Si—O]-MFI, Encilite, AZ-1, [Ga—Si—O]-MFI, ZBH, ZKQ-1B, TS-1, Boralite C, Silicalite, AMS-1B, USC-4, ZMQ-TB, USI-108, NU-5, ZBH, TSZ-III), the Theta-One (TON) structural type (e.g., Theta-1, ZSM-22,ISI-1, NU-10, KZ-2), and the Ferrierite (FER) structural type (e.g., ferrierite, ZSM-35, Sr-D, FU-9), or a combination thereof.

At least one zeolite can be a large pore zeolite, such as MSE framework zeolite (e.g., MCM-68, UZM-35, YNU-2), BEA, FAU, MOR, MTW framework zeolite (e.g. ZSM-12, Theta-3, TPZ-12, NU-13, CZH-5, [Ga—Si—O]-MTW, VS-12, [B—Si—O]-MTW), or a combination thereof.

At least one zeolite can be a medium pore zeolite, such as an MFI framework zeolite (e.g., ZSM-5, FeS-1, MnS-1, Mutinaite, Encilite, AZ-1, ZBH, ZKQ-1B, TS-1, Boralite C, Silicalite, AMS-1B, USC-4, ZMQ-TB, USI-108, NU-5, ZBH, TSZ-III), MTT structure type (e.g., ZSM-23), MRE structure type (e.g., ZSM-48), or a combination thereof.

The MCM-68 and/or ZSM-5 (and/or other MSE/MFI framework zeolite) can have a silicon to aluminum molar ratio (Si/Al ratio) of from about 5:1 to about 100:1, such as from about 10:1 to about 40:1. As described in U.S. Pat. No. 7,198,711, MCM-68 may be used as an additive component in conjunction with a conventional cracking catalyst, such as a large pore molecular sieve.

The catalytic composition may have a cracking catalyst content of from about 0.1 wt % to about 99.99 wt % of the weight of the catalytic composition, such as from about 1 wt % to about 95 wt %, such as from about 5 wt % to about 90 wt %, such as from about 10 wt % to about 80 wt %, such as from about 15 wt % to about 70 wt %, such as from about 20 wt % to about 60 wt %, such as from about 25 wt % to about 50 wt %, such as from about 30 wt % to about 40 wt %, alternately, from about 10 wt % to about 95 wt %, such as from about 20 wt % to about 90 wt %, such as from about 30 wt % to about 80 wt %, such as from about 40 wt % to about 70 wt %.

MCM-68 is a synthetic porous single crystalline phase material. Without being bound by theory, MCM-68 is believed to have a unique 3-dimensional channel system comprising one 12-membered ring channel system and two 10-membered ring channel systems, in which the channels of each system extend perpendicular to the channels of the other systems and in which the 12-ring channels can be straight and the 10-membered ring channels can be tortuous (sinusoidal). The framework structure of MCM-68 has been assigned code MSE by the Structure Commission of the International Zeolite Association. The use of MCM-68 as a catalyst in aromatic alkylation and transalkylation reactions is described in U.S. Pat. No. 6,049,018, the entire contents of which are incorporated herein by reference. The structure of MCM-68 is further discussed in U.S. Pat. No. 7,198,711 and in the Journal of Physical Chemistry B, 110, 2045 (2006), incorporated herein by reference.

A method of synthesizing a crystalline molecular sieve having the MSE framework type, such as MCM-68, is also described in U.S. Pub. No. 2014/0140921A1. MCM-68 has a chemical composition involving the molar relationship: X2O3:(n)YO2, wherein X is a trivalent element selected from at least one of aluminum, boron, gallium, iron, and chromium, such as at least including aluminum; Y is a tetravalent element selected from at least one of silicon, tin, titanium, vanadium, and germanium, such as at least including silicon; and n is at least about 4, such as from about 4 to about 100,000, and can be from about 10 to about 1000, for example from about 10 to about 100.

In at least one embodiment, MCM-68 is thermally stable and, in the calcined form, can exhibit a relatively high total surface area (e.g., about 660 m2/g with micropore volume of about 0.21 mL/g) and significant hydrocarbon sorption capacity (e.g., n-hexane sorption at about 75 torr, about 90° C., about 10.8 wt % relative to the amount of zeolite).

In its active, hydrogen form, MCM-68 can exhibit a relatively high acid activity, with an Alpha Value of about 400 to about 2,000, such as about 500 to about 1,800, such as about 600 to about 1,600. The Alpha Value is an approximate indication of the catalytic cracking activity of the catalyst compared to a standard catalyst, and it gives the relative rate constant (rate of normal hexane conversion per volume of catalyst per unit time). The Alpha Value is based on the activity of silica-alumina cracking catalyst taken as an Alpha of 1 (Rate Constant=0.016 sec-1). The Alpha Test is described in U.S. Pat. No. 3,354,078; in the Journal of Catalysis, 4, 527 (1965); and in the Journal of Catalysis, 6, 278 (1966); and in the Journal of Catalysis, 61, 395 (1980), each incorporated herein by reference as to that description. The experimental conditions of the test used herein include a constant temperature of about 538° C. and a variable flow rate, as described in detail in the Journal of Catalysis, 61, 395 (1980).

MCM-68 can be prepared using one or more structure directing agents such as a tetraalkylammonium cation, Q1, having the general formula Alkyl4N+, for example Ethyl4N+. Optionally, in addition to the tetraalkylammonium cation, Q1, a second structure directing agent may be present, having one or both of the following two general structures (collectively Q2):

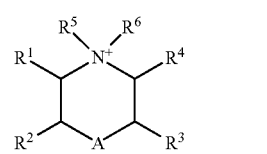 or

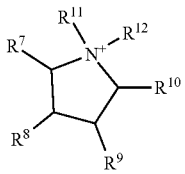

where A is a —C(R13)(R14)-group, a —(C═O)— group, an —N(R15)-, or an —O— group, where R1, R2, R3, R4, R7, R8, R9, and R10 are each independently hydrogen, a hydroxyl group, or a C1-C5 hydrocarbon chain, where R13 and R14 are each independently hydrogen or a C1-C5 hydrocarbon chain, where R5, R6, R11, and R12 are each independently a C1-C5 hydrocarbon chain, where R15 is a bulky C4-C12 hydrocarbon moiety (e.g., a cyclic, branched, and/or hydroxy-functionalized aliphatic and/or aromatic hydrocarbon moiety), such as a cyclohexyl group, a cyclopentyl group, a phenyl group, a C1-C5 alkyl substituted derivative thereof, a C1-C5 alkoxy-substituted derivative thereof, or a C1-C3 dialkyl substituted derivative thereof, and where one of the R5 and R6 groups can alternately be connected to one of the R13 and R14 groups to form a C1-C5 hydrocarbon linking moiety.

Suitable sources of the structure directing agent cations can include any salts of these cations that are not detrimental to the formation of the crystalline material MCM-68, for example, with halides (e.g., iodides) and/or hydroxides as counterions. Thus, though the ammonium nitrogen may not be covalently bonded to any hydroxyl groups, a hydroxyl ion may be an appropriate counterion. Suitable structure directing agents for MSE structure type zeolites (such as MCM-68 and UZM-35) can be found in U.S. Pat. Nos. U.S. Pat. Nos. 9,035,058; 6,049,018; 9,504,995; 8,916,130; 8,900,548; 6,049,018, which are incorporated herein by reference.

Exemplary cyclic ammonium structure direction agent cations (Q2) can include, but are not limited to, N,N-dialkyl-piperazinium cations (e.g., N,N-dimethyl-N'-cyclohexyl-piperazinium, N-methyl-N-ethyl-N'-cyclohexyl-piperazinium, N,N-diethyl-N'-cyclohexyl-piperazinium, N,N-dimethyl-N'-phenyl-piperazinium, N-methyl-N-ethyl-N'-phenyl-piperazinium, N,N-diethyl-N'-phenyl-piperazinium, N,N-dimethyl-N'-cyclopentyl-piperazinium, N-methyl-N-ethyl-N'-cyclopentyl-piperazinium, N,N-diethyl-N'-cyclopentyl-piperazinium, and combinations thereof), 4,4-dialkyl-piperidinium cations (e.g., 4-methyl-4-ethyl-piperidinium, 4-methyl-4-propyl-piperidinium, 4-methyl-4-butyl-piperidinium, 4,4-diethyl-piperidinium, 4-ethyl-4-propyl-piperidinium, 4-ethyl-4-butyl-piperidinium, and combinations thereof), N-alkyl-quinuclidinium cations (e.g., N-methyl-quinuclidinium, 3-hydroxy-N-methyl-quinuclidinium, and a combination thereof), 4,4-dialkyl-morpholinium cations (e.g., 4-methyl-4-ethyl-morpholinium, 4-methyl-4-propyl-morpholinium, 4-methyl-4-butyl-morpholinium, 4,4-diethyl-morpholinium, 4-ethyl-4-propyl-morpholinium, 4-ethyl-4-butyl-morpholinium, and combinations thereof), 4,4-dialkyl-pyrrolidinium cations (e.g., 4-methyl-4-ethyl-pyrrolidinium, 4-methyl-4-propyl-pyrrolidinium, 4-methyl-4-butyl-pyrrolidinium, 4,4-diethyl-pyrrolidinium, 4-ethyl-4-propyl-pyrrolidinium, 4-ethyl-4-butyl-pyrrolidinium, and combinations thereof), and combinations thereof.

When more than one cation source is used in the structure directing agent composition, the molar ratio of Q1 to Q2 can be at least about 1:9, such as about 1:9 to about 49:1, such as about 1:7 to about 19:1, such as about 1:5 to about 9:1, such as about 1:4 to about 7:1, such as about 1:3 to about 5:1, such as about 1:2 to about 4:1, such as about 1:1 to about 3:1. Additionally or alternately, when more than one cation source is used in the structure directing agent composition, the molar ratio of Q1 to Q2 can be about 999:1 or less, such as about 499:1 to 1:1, such as about 199:1 to about 2:1, such as about 99:1 to about 3:1, such as about 49:1 to about 4:1, such as about 19:1 to about 5:1.

In at least one embodiment, a reaction mixture is produced including a source of water, a source of an oxide of a tetravalent element, Y, selected from at least one of silicon, tin, titanium, vanadium, and germanium, a source of an oxide of trivalent element, X, selected from at least one of aluminum, boron, gallium, iron, and chromium, a source of an alkali or alkaline earth metal, M, together with a source of Q1 cations and optionally a source of Q2 cations (with Q herein representing all structure directing cations, Q1+Q2. In other words, Q=Q1+Q2).

For example, the composition of the reaction mixture can be controlled so that the molar ratio Q1/YO2 or Q/YO2 ([Q1+Q2]/YO2) in said reaction mixture can be in the range from about 0.01 to about 1, such as from about 0.03 to about 0.7, such as from about 0.05 to about 0.5, such as from about 0.07 to about 0.35. Additionally or alternately, the composition of the reaction mixture can be controlled by selecting one or more of the following molar ratios: YO2/X2O3 from about 4 to about 200, such as from about 4 to about 150, such as from about 4 to about 120, such as from about 4 to about 100, such as from about 4 to about 80, such as from about 6 to about 200, such as from about 6 to about 150, such as from about 6 to about 120, such as from about 6 to about 100, such as from about 6 to about 80, such as from about 8 to about 200, such as from about 8 to about 150, such as from about 8 to about 120, such as from about 8 to about 100, such as from about 8 to about 80, such as from about 12 to about 200, such as from about 12 to about 150, such as from about 12 to about 120, such as from about 12 to about 100, such as from about 12 to about 80, such as from about 15 to about 200, such as from about 15 to about 150, such as from about 15 to about 120, such as from about 15 to about 100, such as from about 15 to about 80, such as from about 18 to about 200, such as from about 18 to about 150, such as from about 18 to about 120, such as from about 18 to about 100, such as from about 18 to about 80; H2O/YO2 from about 5 to about 200, such as from about 5 to about 150, such as from about 5 to about 100, such as from about 5 to about 50, such as from about 5 to about 35, such as from about 10 to about 200, such as from about 10 to about 150, such as from about 10 to about 100, such as from about 10 to about 50, such as from about 10 to about 35, such as from about 14 to about 200, such as from about 14 to about 150, such as from about 14 to about 100, such as from about 14 to about 50, such as from about 14 to about 35, such as from about 18 to about 200, such as from about 18 to about 150, such as from about 18 to about 100, such as from about 18 to about 50, such as from about 18 to about 35; OH—/YO2 from about 0.05 to about 1.5, such as from about 0.05 to about 1.3, such as from about 0.05 to about 1.2, such as from about 0.05 to about 1.1, such as from about 0.05 to about 1, such as from about 0.05 to about 0.9, such as from about 0.05 to about 0.85, such as from about 0.05 to about 0.8, such as from about 0.05 to about 0.75, such as from about 0.05 to about 0.7, such as from about 0.05 to about 0.65, such as from about 0.05 to about 0.6, such as from about 0.15 to about 1.5, such as from about 0.15 to about 1.3, such as from about 0.15 to about 1.2, such as from about 0.15 to about 1.1, such as from about 0.15 to about 1, such as from about 0.15 to about 0.9, such as from about 0.15 to about 0.85, such as from about 0.15 to about 0.8, such as from about 0.15 to about 0.75, such as from about 0.15 to about 0.7, such as from about 0.15 to about 0.65, such as from about 0.15 to about 0.6, such as from about 0.25 to about 1.5, such as from about 0.25 to about 1.3, such as from about 0.25 to about 1.2, such as from about 0.25 to about 1.1, such as from about 0.25 to about 1, such as from about 0.25 to about 0.9, such as from about 0.25 to about 0.85, such as from about 0.25 to about 0.8, such as from about 0.25 to about 0.75, such as from about 0.25 to about 0.7, such as from about 0.25 to about 0.65, such as from about 0.25 to about 0.6, such as from about 0.5 to about 1.5, such as from about 0.5 to about 1.3, such as from about 0.5 to about 1.2, such as from about 0.5 to about 1.1, such as from about 0.5 to about 1, such as from about 0.5 to about 0.9, such as from about 0.5 to about 0.85, such as from about 0.5 to about 0.8, such as from about 0.6 to about 1.5, such as from about 0.6 to about 1.3, such as from about 0.6 to about 1.2, such as from about 0.6 to about 1.1, such as from about 0.6 to about 1, such as from about 0.6 to about 0.9, such as from about 0.6 to about 0.85, such as from about 0.6 to about 0.8, such as from about 0.65 to about 1.5, such as from about 0.65 to about 1.3, such as from about 0.65 to about 1.2, such as from about 0.65 to about 1.1, such as from about 0.65 to about 1, such as from about 0.65 to about 0.9, such as from about 0.65 to about 0.85, such as from about 0.65 to about 0.8, such as from about 0.7 to about 1.5, such as from about 0.7 to about 1.3, such as from about 0.7 to about 1.2, such as from about 0.7 to about 1.1, such as from about 0.7 to about 1, such as from about 0.7 to about 0.9, such as from about 0.7 to about 0.85, such as from about 0.7 to about 0.8, such as from about 0.75 to about 1.5, such as from about 0.75 to about 1.3, such as from about 0.75 to about 1.2, such as from about 0.75 to about 1.1, such as from about 0.75 to about 1, such as from about 0.75 to about 0.9, such as from about 0.75 to about 0.85; and M/YO2 from about 0.05 to about 2, such as from about 0.05 to about 1.5, such as from about 0.05 to about 1.2, such as from about 0.05 to about 1.1, such as from about 0.05 to about 1, such as from about 0.05 to about 0.9, such as from about 0.05 to about 0.8, such as from about 0.05 to about 0.7, such as from about 0.05 to about 0.6, such as from about 0.10 to about 2, such as from about 0.10 to about 1.5, such as from about 0.10 to about 1.2, such as from about 0.10 to about 1.1, such as from about 0.10 to about 1, such as from about 0.10 to about 0.9, such as from about 0.10 to about 0.8, such as from about 0.10 to about 0.7, such as from about 0.10 to about 0.6, such as from about 0.15 to about 2, such as from about 0.15 to about 1.5, such as from about 0.15 to about 1.2, such as from about 0.15 to about 1.1, such as from about 0.15 to about 1, such as from about 0.15 to about 0.9, such as from about 0.15 to about 0.8, such as from about 0.15 to about 0.7, such as from about 0.15 to about 0.6, such as from about 0.20 to about 2, such as from about 0.20 to about 1.5, such as from about 0.20 to about 1.2, such as from about 0.20 to about 1.1, such as from about 0.20 to about 1, such as from about 0.20 to about 0.9, such as from about 0.20 to about 0.8, such as from about 0.20 to about 0.7, such as from about 0.20 to about 0.6, such as from about 0.30 to about 2, such as from about 0.30 to about 1.5, such as from about 0.30 to about 1.2, such as from about 0.30 to about 1.1, such as from about 0.30 to about 1, such as from about 0.30 to about 0.9, such as from about 0.30 to about 0.8, such as from about 0.40 to about 2, such as from about 0.40 to about 1.5, such as from about 0.40 to about 1.2, such as from about 0.40 to about 1.1, such as from about 0.40 to about 1, such as from about 0.40 to about 0.9, such as from about 0.40 to about 0.8. It should be noted that, although molar ratios of OH—/YO2 are used throughout this description, it should be understood that such molar ratios are meant to encompass whatever the chemical nature of the counterions of M and Q, and are only expressed herein as OH—/YO2 because hydroxyl counterions can be specifically used. Similarly, where specific examples of Y, X, M, and Q are mentioned herein in molar ratios, their ranges should be understood to extend generically to the variable, unless expressly disclaimed, and not necessarily merely limited to the individual species of the variable genus.

The reaction mixture can also optionally comprise seeds of MSE framework type molecular sieve, such as MCM-68, for example, such that the weight ratio of seeds/YO2 in the reaction mixture can be from about 0.001 to about 0.3, such as from about 0.001 to about 0.2, such as from about 0.001 to about 0.1, such as from about 0.001 to about 0.08, such as from about 0.001 to about 0.05, such as from about 0.01 to about 0.3, such as from about 0.01 to about 0.2, such as from about 0.01 to about 0.1, such as from about 0.01 to about 0.08, such as from about 0.01 to about 0.05, such as from about 0.03 to about 0.3, such as from about 0.03 to about 0.2, such as from about 0.03 to about 0.1, such as from about 0.03 to about 0.08.

The tetravalent element, Y, may include or be silicon, the trivalent element, X, may include or be aluminum, and the alkali or alkaline earth metal, M, may include at least one of sodium and potassium. When the alkali or alkaline earth metal, M, includes potassium, the molar ratio of Na to the total metal M may be from 0 to about 0.9, for example, such as from 0 to about 0.5. Thus, in at least one embodiment, the alkali or alkaline earth metal can include substantially no sodium (e.g., less than 5 wt % of M can be sodium, such as less than 3 wt %, such as less than 1 wt %, such as less than 0.5 wt %, such as less than 0.3 wt %, such as less than 0.1 wt %, such as less than 0.05 wt %, such as 0 wt %). Additionally or alternately, the reaction mixture may include no added sodium (e.g., though some sodium may be present as an impurity in one or more of the reaction mixture ingredients, no component is added to introduce sodium to the reaction mixture, e.g., though potassium hydroxide may contain some sodium hydroxide impurity, no sodium hydroxide is added).

Suitable sources of silicon oxide that can be used to produce the reaction mixture described above can include, but are not limited to, colloidal silica, precipitated silica, potassium silicate, sodium silicate, fumed silica, as well as combinations thereof. Suitable sources of aluminum oxide can include, but are not limited to, hydrated aluminum oxides, such as boehmite, gibbsite, and pseudoboehmite, especially gibbsite, as well as oxygen-containing aluminum salts, such as aluminum nitrate, as well as combinations thereof. Suitable sources of alkali metal can include sodium and/or potassium hydroxide.

When the reaction mixture has been prepared, crystallization to produce MCM-68 can be conducted under either static or stirred conditions in a suitable reactor vessel, such as for example, polypropylene jars or stainless steel autoclaves optionally lined with Teflon®, e.g., at a temperature of from about 100° C. to about 200° C., for up to about 28 days, such as at a temperature of from about 145° C. to about 175° C., for about 24 hours to about 170 hours. Thereafter, the crystals can be separated from the liquid and recovered.

The product of the synthesis reaction can advantageously include or be a crystalline molecular sieve having the MSE framework type and containing within its pore structure the structure directing agent(s) described herein. The resultant as-synthesized material can have an X-ray diffraction pattern distinguishable from the patterns of other known as-synthesized or thermally treated crystalline materials, as described in U.S. Pub. No. 2014/0140921A1, the entire contents of which are incorporated herein by reference.

As-synthesized crystalline molecular sieve containing structure directing agent(s) within its pore structure can normally be activated before use in such a manner as to substantially remove the structure directing agent(s) from the molecular sieve, leaving active catalytic sites within the microporous channels of the molecular sieve open for contact with a feedstock. The activation process can be accomplished by heating the molecular sieve at a temperature from about 200° C. to about 800° C. for an appropriate period of time in the presence of an oxygen-containing gas. Alternately, activation can be accomplished (e.g., the SDA effectively removed) by exposure to ozone at temperatures below about 500° C., e.g., about 300° C. or less.

Furthermore, the original alkali (and/or alkaline earth) cations of the as-synthesized material MCM-68 can be replaced in accordance with suitable techniques, at least in part, such as by ion exchange with other cations, which can include, but are not limited to, metal ions, hydrogen ions, hydrogen ion precursors, e.g., ammonium ions, and mixtures thereof. For example, exchange cations, when present, can include those that can tailor the catalytic activity for certain hydrocarbon conversion reactions (e.g., hydrogen, rare earth metals, and metals of groups 3, 4, 5, 6, 7, 8, 9, 10, 11, 12, and 13 of the Periodic Table of the Elements; when the cations are alkali metal cations, the exchange cations can additionally or alternately include alkaline earth, or group 2, metals).

When an additional zeolite other than an MSE and/or MFI framework zeolite is present, the additional zeolites can optionally correspond to at least one medium pore (10-membered ring pore) aluminosilicate zeolite having a Constraint Index of 1-12 (as defined in U.S. Pat. No. 4,016,218). An example of another suitable zeolite can be a zeolite having an MEL framework, such as ZSM-11. With regard to zeolites that include heteroatoms different from silicon and aluminum in the zeolite framework, non-limiting examples of SAPO and AlPO molecular sieves having a zeolitic framework structure can include one or a combination of SAPO-11, SAPO-31, SAPO-41, AlPO-11, AlPO-31, AlPO-41 and PST-6. Optionally, a zeolite can also be at least one large pore aluminosilicate, aluminophosphate, or silicoaluminophosphate zeolite containing 12-membered ring pores.

Optionally, the MSE and/or MFI framework zeolite can include phosphorus. For example, including phosphorus can potentially provide increased stability for a zeolite in the reaction conditions present during the dehydrocracking process, as described herein. The weight of the phosphorus can be of from about 0.1 wt % to about 10 wt % based on the weight of the dehydrocracking catalyst, such as from about 0.1 wt % to about 5 wt, such as from about 0.1 wt % to about 3 wt %. The total weight of the phosphorus shall not include amounts attributable to the zeolite itself due to the presence of phosphorus in the framework of the zeolitic structure.

H-Zeolites

In at least one embodiment, the catalytic composition includes a catalyst that includes one or more zeolites under acidic form, also referred to as an H-zeolite. H-zeolites can provide cracking activity during use. In such aspects, at least one H-zeolite can correspond to an MSE framework zeolite (e.g., H-MCM-68, UZM-35, H—YNU-2), an H-MFI framework zeolite (e.g., H-ZSM-5, H—FeS-1, H—MnS-1, H—[As—Si—O]-MFI, H-Encilite, H-AZ-1, H—[Ga—Si—O]-MFI), a TON structure type (e.g. ZSM-22, NU-10, THETA-1, KZ-2), an MTT structure type (e.g. ZSM-23), an MRE structure type (e.g. ZSM-48) or a combination thereof.

For purposes of the present disclosure, the acid form of the zeolite, such as H-MCM-68, can be formed by pre-calcining a (not acidified) zeolite at a temperature of from about 200° C. to about 600° C., such as from about 250° C. to about 550° C., such as from about 300° C. to about 500° C., such as from about 350° C. to about 450° C. Calcination can be carried out under an inert gas atmosphere, such as nitrogen or argon, for about 10 minutes to about 120 minutes, such as from about 20 minutes to about 60 minutes, such as about 30 minutes, for example. Then, the inert gas can be replaced by an air flow. The calcination can then be further carried out at a temperature of from about 400° C. to about 800° C., such as from about 500° C. to about 700° C. (e.g., 600° C.), and/or at a reaction time of from about 10 minutes to about 6 hours, such as from about 30 minutes to about 4 hours, such as from about 1 hour to about 2 hours.

The resulting material can be converted to a corresponding ammonium form intermediate (an "ammonium zeolite"), such as NH4-MCM-68, by contacting the calcined zeolite with any suitable ammonium salt, such as NH4Cl, (NH4) 2SO4, or NH4NO3. The contacting can be performed at a temperature of from about 50° C. to about 150° C., such as from about 75° C. to about 125° C. (e.g., 98° C.). Between each ammonium treatment processes, such as the completion of at least three treatment processes, NH4-zeolite can be "washed" with water. Subsequently steaming reactions can be carried out for a time period of from about 2 hours to about 10 hours, such as from about 4 hours to about 8 hours (e.g., 6 hours), and/or at a temperature of from about 400° C. to about 700° C., such as from about 450° C. to about 650° C., such as from about 500° C. to about 600° C. (e.g., 538° C.). The ammonium zeolite, e.g. NH4-MCM-68, can then be calcined in air at a temperature of from about 200° C. to about 800° C., such as from about 300° C. to about 700° C., such as from about 400° C. to about 600° C. (e.g., 500° C.), and/or calcined for a time period of from about 30 minutes to about 6 hours, such as from about 1 hour to about 5 hours, such as from about 2 hours to about 4 hours, to create the acid form of the zeolite (an "H-zeolite"), H-MCM-68.

The H-zeolite, such as H-MCM-68 and/or H-ZSM-5 (and/or other H-MSE/H-MFI framework zeolite), can have a silicon to aluminum molar ratio (Si/Al ratio) of from about 0.001 to about 20, such as from about 0.01 to about 15, such as from about 0.1 to about 12.5. In at least one embodiment, the Si/Al molar ratio of an H-zeolite is about 10. If more than one H-zeolite is present, other suitable H-zeolites can include medium pore and/or large pore zeolites.

In at least one embodiment, the catalytic composition has an H-zeolite content of from about 0.1 wt % to about 99.99 wt % of the weight of the catalytic composition, such as from about 1 wt % to about 95 wt %, such as from about 5 wt % to about 90 wt %, such as from about 10 wt % to about 80 wt %, such as from about 15 wt % to about 70 wt %, such as from about 20 wt % to about 60 wt %, such as from about 25 wt % to about 50 wt %, such as from about 30 wt % to about 40 wt %, alternately, from about 10 wt % to about 95 wt %, such as from about 20 wt % to about 90 wt %, such as from about 30 wt % to about 80 wt %, such as from about 40 wt % to about 70 wt %.

The H-zeolite component can have a total surface area of from about 300 m2/g to about 700 m2/g, such as from about 350 m2/g to about 650 m2/g, such as from about 400 m2/g to about 600 m2/g. The H-zeolite component can have a total pore volume of about 0.1 mL/g to about 0.8 mL/g, such as from about 0.15 mL/g to about 0.7 mL/g, such as from about 0.2 mL/g to about 0.6 mL/g.

The H-zeolite component can have a hydrocarbon sorption capacity (e.g., n-hexane sorption) at about 75 torr, about 90° C., of about 40 mg/g to about 150 mg/g, such as from about 50 mg/g to about 130 mg/g, such as from about 60 mg/g to about 80 mg/g alternatively from about 90 mg/g to about 110 mg/g.

H-Meso-Zeolites

In at least one embodiment, the catalytic composition includes a catalyst that comprises one or more H-meso-zeolites under acidic and mesoporous form, also referred to as an H-meso-zeolite, that provides cracking activity. In such aspects, at least one H-meso-zeolite can correspond to an H-meso-MSE framework zeolite (e.g., H-meso-MCM-68, H-meso-YNU-2), an H-meso-MFI framework zeolite (e.g., H-meso-ZSM, H-meso-FeS-1, H-meso-MnS-1, H-meso-[As—Si—O]-MFI, H-meso-Encilite, H-meso-AZ-1, H-meso-[Ga—Si—O]-MFI), or a combination thereof.

The H-meso-zeolites can be prepared from the H-zeolites via a desilication process and a dealumination process by introducing to the H-zeolite: i) an alkaline solution (e.g., NaOH) at a temperature of from about 25° C. to about 150° C. (e.g., 65° C.), for about 5 minutes to about 60 minutes (e.g., 30 minutes); and ii) any suitable chelating agent capable to chelate aluminum atoms from the framework (e.g., EDTA), thus leading to the formation of the mesopores. For example, EDTA can be combined with polyvalent cations, including aluminum ions, to form a soluble nonionic complex that can be removed by simple work-out (e.g., filtration; washing process with water). The desilication process of the H-zeolites can be carried out at a temperature of from about 25° C. to about 150° C. (e.g., 65° C.), for about 5 minutes to about 60 minutes (e.g., 30 minutes), using an alkaline solution (e.g., NaOH) or a mixture of an alkaline solution (e.g., NaOH) with an ammonium salt, such as a tetra-alkyl ammonium salt (e.g., tetrapropylammonium bromide, also referred to as TPABr). The mixture can be stirred in one or more polar protic solvent(s), such as water. The dealumination can be carried out subsequently after desilication, at a temperature of from about 25° C. to about 150° C. (e.g., 100° C.), for about 5 minutes to about 24 hours (e.g., 6 hours), using any suitable chelating agent capable to chelate aluminum atoms from the framework (e.g., EDTA). Further treatment of the resulting product formed after desilication/dealumination may include purifying and isolating the resulting product by ion exchange process.

Any suitable methods for evaluating the mesoporosity of zeolites can be used. For example, the total surface area of the mesoporous zeolites can be evaluated using the Brunauer-Emmett-Teller (BET) surface adsorption method. The pore size distribution can be calculated from the desorption branch of the isotherm using the Barrett-Joyner-Halenda (BJH) method with Halsey Faas correction. The formation of a hysteresis loop is an indication of the presence of mesopores, which can be generated by desilication (removal of silicon atoms) of the H-zeolite, for example. In at least one embodiment, the pore size distribution of the H-meso-zeolite indicates a strong enhancement of the mesopore volume. As used herein, "mesopore volume" is the accumulated volume in the pore size range of from about 2 nm to about 50 nm of the H-mesopore zeolite. The total mesopore volume can be of from about 0.1 mL/g to about 0.8 mL/g, such as from about 0.15 mL/g to about 0.75 mL/g, such as from about 0.2 mL/g to about 0.7 mL/g, such as about 0.32 mL/g to about 0/36 mL/g, as measured by BET surface adsorption.

The H-meso-zeolite component can have a total surface area of from about 350 m2/g to about 600 m2/g, such as from about 375 m2/g to about 575 m2/g, such as from about 400 m2/g to about 550 m2/g. The H-meso-zeolite component can have a total pore volume of about 0.1 mL/g to about 0.8 mL/g, such as from about 0.15 mL/g to about 0.75 mL/g, such as from about 0.2 mL/g to about 0.7 mL/g, such as from about 0.42 mL/g to about 0.46 mL/g, as measured by BET surface adsorption.

The H-meso-zeolite component can have a hydrocarbon sorption capacity (e.g., n-hexane sorption) at about 75 torr, about 90° C., of about 40 mg/g to about 150 mg/g, such as from about 50 mg/g to about 130 mg/g, such as from about 60 mg/g to about 120 mg/g.

An H-meso-zeolite can have a Si/Al molar ratio of from about 0.001 to about 40, such as from about 0.1 to about 35, such as from about 1 to about 30, such as from about 5 to about 25, such as from about 7.5 to about 20, such as from about 5 to about 12. In at least one embodiment, the Si/Al molar ratio of H-meso-MCM-68 is about 9. If more than one zeolite is present, other suitable zeolites can include medium pore and/or large pore zeolites.

In at least one embodiment, the catalytic composition has an H-meso-zeolite content of from about 0.1 wt % to about 99.99 wt % of the weight of the catalytic composition, such as from about 1 wt % to about 95 wt %, such as from about 5 wt % to about 90 wt %, such as from about 10 wt % to about 80 wt %, such as from about 15 wt % to about 70 wt %, such as from about 20 wt % to about 60 wt %, such as from about 25 wt % to about 50 wt %, such as from about 30 wt % to about 40 wt %, alternately, from about 10 wt % to about 95 wt %, such as from about 20 wt % to about 90 wt %, such as from about 30 wt % to about 80 wt %, such as from about 40 wt % to about 70 wt %.

Second Catalytic Component of the Catalytic Composition: Dehydrogenation Component.

Group 13-Zeolites

Acidic forms of zeolites of the present disclosure can have one or more transition metals disposed therein. In at least one embodiment, one or more H-zeolites, such as H-MSE and/or H-MFI framework zeolite, can further include a transition metal, such as one or more group 13 transition metal, in a form of Ga or In, for example, or a combination thereof. Group 13 metal can include Al, Ga, In, Tl, for example. The transition metal can be incorporated onto/into, e.g. disposed within, the H-zeolite by any suitable method, such as by impregnation and/or by ion exchange.

For example, the H-zeolite (e.g., H-MCM-68) can be impregnated with a group 13 transition metal content (e.g., Ga) of from about 0.01 wt % to about 99.99 wt % of the weight of the H-zeolite, such as from about 0.5 wt % to about 75 wt %, such as from about 1 wt % to about 50 wt %. For example, an H-zeolite can be impregnated with a transition metal, such as Ga, using an aqueous solution of a metal nitrate, such as gallium (III) nitrate hydrate (99.9%), followed by drying, such as for about 2 hours to about 8 hours (e.g., 6 hours). Drying can be performed at ambient conditions, followed by additional drying for about 10 hours to about 20 hours (e.g., 16 hours) and/or at a temperature of from about 70° C. to about 150° C. (e.g., about 120° C.). After drying, the catalyst can be calcined in air (about 5 L/min flow rate, for example) at a temperature of from about 400° C. to about 700° C., such as from about 500° C. to about 600° C. (e.g., about 540° C.), and/or for about 30 minutes to about 6 hours, such as from about 1 hour to about 5 hours (e.g., about 3 hours).

The group 13-zeolite component can have a total surface area of from about 300 m2/g to about 700 m2/g, such as from about 325 m2/g to about 675 m2/g, such as from about 350 m2/g to about 650 m2/g. The group 13-zeolite component can have a total pore volume of about 0.1 mL/g to about 0.6 mL/g, such as from about 0.15 mL/g to about 0.55 mL/g, such as from about 0.2 mL/g to about 0.5 mL/g such as from about 0.42 mL/g to about 0.46 mL/g, as measured by BET surface adsorption.

The group 13-zeolite component can have a hydrocarbon sorption capacity (e.g., n-hexane sorption) at 75 torr, about 90° C., of about 40 mg/g to about 150 mg/g, such as from about 50 mg/g to about 130 mg/g, such as from about 60 mg/g to about 120 mg/g.

A group 13-zeolite can have a Si/Al molar ratio of from about 0.001 to about 40, such as from about 0.1 to about 35, such as from about 1 to about 30, such as from about 5 to about 25, such as from about 7.5 to about 20, such as from about 10 to about 15. In at least one embodiment, the Si/Al molar ratio of group 13-MCM-68 catalyst (e.g., Ga-MCM-68) is about 12.

For purposes of the present disclosure, the group 13 transition metal atom can be Ga, In, TI, or Al. The catalytic composition can have a transition metal content of from about 0.05 wt % to about 50 wt %, of the weight of the dehydrocracking catalyst, such as from about 0.1 wt % to about 40 wt %, such as from about 0.5 wt % to about 30 wt %, such as from about 0.75 wt % to about 20 wt %. In at least one embodiment, the catalytic composition Ga-MCM-68 has a Ga content of from about 0.5 wt % to about 2 wt %.

Group 13-Meso-Zeolites

Meso forms of zeolite catalysts of the present disclosure can also contain a transition metal disposed thereon (e.g., disposed within the meso zeolite). In at least one embodiment, one or more H-meso-zeolites, such as H-meso-MSE framework zeolite (e.g., H-meso-MCM-68, H-meso-UZM-35, H-meso-YNU-2), an H-meso-MFI framework zeolite (e.g., H-meso-ZSM, H-meso-FeS-1, H-meso-MnS-1, H-meso-[As—Si—O]-MFI, H-meso-Encilite, H-meso-AZ-1, H-meso-[Ga—Si—O]-MFI), or a combination thereof, can further include a transition metal, such as one or more group 13 transition metal, in a form of Ga or In, for example, or a combination thereof. The transition metal can be incorporated into the H-meso-zeolite by any suitable method, such as by impregnation and/or by ion exchange.

For example, an H-meso-zeolite can be impregnated with a transition metal, such as Ga, using an aqueous solution of a metal nitrate, such as gallium (III) nitrate hydrate (99.9%), followed by drying, such as for about 2 hours to about 8 hours (e.g., 6 hours). Drying can be performed at ambient conditions, followed by additional drying for about 10 hours to about 20 hours (e.g., 16 hours) and/or at a temperature of from about 70° C. to about 150° C. (e.g., about 121° C.). After drying, the catalyst can be calcined (e.g., in air at about 5 L/min flow rate, for example) at a temperature of from about 400° C. to about 700° C., such as from about 500° C. to about 600° C. (e.g., about 538° C.), and/or for about 30 minutes to about 6 hours, such as from about 1 hour to about 5 hours (e.g., about 3 hours).

For purpose of the present disclosure, a group 13-meso-zeolite component can be a large pore zeolite. The group 13-meso-zeolite component can have a total surface area of from about 300 m2/g to about 700 m2/g, such as from about 325 m2/g to about 675 m2/g, such as from about 350 m2/g to about 650 m2/g. The group 13-meso-zeolite can have a total pore volume of about 0.1 mL/g to about 0.6 mL/g, such as from about 0.15 mL/g to about 0.55 mL/g, such as from about 0.2 mL/g to about 0.5 mL/g.

The group 13-meso-zeolite component can have a hydrocarbon sorption capacity (e.g., n-hexane sorption) at about 75 torr, about 90° C., of about 40 mg/g to about 150 mg/g, such as from about 50 mg/g to about 130 mg/g, such as from about 60 mg/g to about 120 mg/g.

A group 13-meso-zeolite can have a Si/Al (molar) ratio of from about 0.001 to about 40, such as from about 0.1 to about 35, such as from about 1 to about 30, such as from about 5 to about 25, such as from about 7.5 to about 20, such as from about 10 to about 15. In at least one embodiment, the Si/Al molar ratio of group 13-meso-MCM-68 catalyst is about 9.

For purposes of the present disclosure, the group 13 transition metal atom can be Ga. The catalytic composition can have a Ga content of from about 0.05 wt % to about 50 wt %, of the weight of the dehydrocracking catalyst, such as from about 0.1 wt % to about 40 wt %, such as from about 0.5 wt % to about 30 wt %, such as from about 0.75 wt % to about 20 wt %. In at least one embodiment, the catalytic composition Ga-MCM-68 has a Ga content of from about 0.5 wt % to about 2 wt %.

In at least one embodiment, the group 13 transition metal is introduced/encapsulated inside a zeolite framework. In an alternate embodiment, the group 13 transition metal is introduced/encapsulated inside a zeolite framework and "coordinated" with the zeolite framework so that the group 13 transition metal is localized outside the framework.

Support Material (Binder)

A catalyst composition according to the present disclosure optionally also contains a support material, such as a binder, in addition to the zeolite component. The binder component is present in the catalyst in the form of a matrix in which the zeolites are embedded. Inorganic oxides, such as aluminium oxide, magnesium oxide, titanium oxide, zinc oxide, niobium oxide, zirconium oxide or silicon oxide, as well as mixtures thereof, in particular mixtures of the above-named oxides with aluminium oxide, as well as amorphous aluminosilicates and non-oxidic binders such as for example aluminium phosphates can be used as binders. Aluminium oxide is preferably used. Modified aluminium oxide such as for example phosphorous-modified aluminium oxide can likewise be used. The use of finely divided aluminium oxide binder, which can be obtained by hydrolysis of aluminium trialkylene or aluminium alcoholates or is used in the form of peptizable hydrous aluminium oxide, is particularly preferred. Peptizable hydrous aluminium oxide is quite particularly preferably used as binder. Further preferably, at least 95% of the particles of the peptizable hydrous aluminium oxide (relative to the average diameter) are ≤100 μm.

It is further preferred to use the binder in a quantity of from 5 wt % to 60 wt %, such as 10 to 40 wt %, such as 15 wt % to 35 wt %, relative to the total weight of the catalyst composition (i.e. zeolite and binder).

The BET surface area of the catalyst according to the invention is 250 m2/g to 500 m2/g, preferably 300 m2/g to 450 m2/g and particularly preferably 320 m2/g to 400 m2/g, determined in accordance with DIN 66131.

Dehydrocracking Process

The present disclosure relates to processes where C3-C7 hydrocarbon feedstocks and the mesoporous zeolite-based catalyst composition are contacted under dehydrocracking conditions. The feedstock can be introduced as-is, or diluted in an inert gas (e.g., N2). Dilution of the feed may lower the hydrocarbon partial pressure, which would result in lower conversion, but nonetheless provide higher product selectivity, as compared to a process that does not involve dilution.

In at least one embodiment, the dehydrocracking is performed in one or more reactor(s) connected in series or in parallel. The catalytic dehydrocracking process can be performed in any suitable reactors, such as fixed bed reactor, moving bed reactor or fluidized bed reactor and the C3-C7 hydrocarbon flow may be either concurrent or countercurrent to the catalyst flow. In at least one embodiment, a catalytic dehydrocracking process is performed using a fixed-bed reactor, such as a flow-type reactor in fixed-bed mode.

One or more reactors in series or in parallel may be used, such as one or more reactors in parallel may be used. The mesoporous zeolite-based catalyst composition may be delivered as a powder, pellets, solution, slurry, or a mixture thereof, either separately to the reactor, activated in-line just prior to the reactor, or preactivated, and pumped as an activated solution or slurry to the reactor. Dehydrocracking can be carried out in either single reactor operation, in which feedstocks and mesoporous zeolite-based catalyst composition(s) are added continuously to a single reactor or in series reactor operation, in which the above components can be added to each of two or more reactors connected in series. The catalyst components can be added to the first reactor in the series. The catalyst component may also be added to both reactors, with one component being added to a first reactor and another component to other reactors. In at least one embodiment, the dehydrocracking process is a continuous process.

In at least one embodiment, a process of dehydrocracking C3-C7 hydrocarbon feedstocks to produce at least one olefin, such as propylene and hydrogen is provided. The process may include contacting at least one C3-C7 hydrocarbon, such as n-hexane, pentane, or iso-pentane, with a mesoporous zeolite-based catalyst composition (e.g., an H-meso zeolite or a Group 13-meso-zeolite) of the present disclosure; and obtaining a smaller molecular weight olefin, such as propylene.

In at least one embodiment, a process of dehydrocracking C3-C7 hydrocarbon feedstocks to produce at least one C2-C4 olefin (e.g., propylene) is conducted using a Ga-meso-MCM-68 catalyst.

Dehydrocracking processes can be performed at any temperature and/or pressure suitable to obtain a C2-C4 olefin. In at least one embodiment, temperatures and/or pressures include a temperature in the range of from about 400° C. to about 600° C., such as about 425° C. to about 575° C., such as about 450° C. to about 550° C. (e.g., about 540° C.); at atmospheric pressure; and/or a weight hourly space velocity (WHSV) of from about 50 h-1 to about 800 h-1, such as from about 125 h-1 to about 775 h-1, such as from about 150 h-1 to about 750 h-1, such as from about 175 h-1 to about 725 h-1, such as from about 200 h-1 to about 700 h-1, alternatively from about 50 h-1 to about 200 h-1.

In at least one embodiment, the dehydrocracking reaction is performed using intermittent air (e.g., O2) regeneration processes to regenerate the catalyst by removing coke from the catalyst. The amount of coke formed depends on the operating conditions during the dehydrocracking reaction and the specific catalyst used. A suitable run time of the dehydrocracking reaction before air (e.g. O2) regeneration could be at least 60 minutes. Flow of the dehydrocracking feed may be stopped, and air (e.g., O2) can then be introduced to the catalyst for about 10 minutes to regenerate the catalyst. Air (e.g., O2) regeneration can be performed at a temperature of from about 500° C. to about 600° C., such as from about 525° C. to about 575° C., such as about 550° C. Multiple air regeneration cycles can be performed at two or more temperatures. For example, in at least one embodiment, about 5 air regeneration cycles can be performed at 500° C., about 5 air regeneration cycles performed at 525° C., about 5 air regeneration cycles performed at 550° C., about 5 air regeneration cycles performed at 575° C., and/or about 5 air regeneration cycles performed at 600° C.

In at least one embodiment, the air used for catalyst regeneration includes about 1 mol % to about 15 mol % O2, such as about 5 mol % O2. The air used for regeneration may include about 50 mol % to about 70 mol % N2, such as about 61 mol % N2. The air used for regeneration may include from about 20 mol % to about 50 mol % H2O, such as about 34 mol % H2O. Alternatively, the air used for catalyst regeneration includes about 100% O2.

In at least one embodiment, hydrogen is present in the dehydrocracking reactor during a dehydrocracking process at a partial pressure of about 0.05 Torr to about 2,500 Torr (about 0.05 mbar to about 3,333 mbar), such as from about 0.5 Torr to about 1,500 Torr (about 0.67 mbar to about 2,000 mbar), such as about 5 Torr to about 500 Torr (about 5.67 mbar to about 667 mbar).

For example, helium is present in the dehydrocracking reactor during a dehydrocracking process at a partial pressure of about 0.05 Torr to about 200 Torr (about 0.05 mbar to about 2667 mbar), such as from about 0.5 Torr to about 250 Torr (about 0.67 mbar to about 333 mbar), such as about 5 Torr to about 150 Torr (about 5.67 mbar to about 200 mbar). In at least one embodiment, helium is present in the dehydrocracking reactor at a partial pressure of about 100 Torr (133 mbar).

In at least one embodiment, the conversion of C3-C7 hydrocarbon feedstocks is at least 5%, based upon the weight of the feedstock entering the reaction zone, such as 10% or more, such as 15% or more, such as 20% or more, such as 25% or more, such as 50% or more, such as 60% or more, such as 70% or more, such as 80% or more, such as 90% or more.

Processes of the present disclosure can provide a simple method to upgrade excess gasoline as produced within a crude oil refinery to more valuable compositions, such as upgrading gasoline to propylene. The paraffinic feedstock can be natural gas liquids, light straight run naphtha, condensates. Other suitable paraffinic feedstocks may include pentane and iso-pentane compounds. Furthermore, natural gas liquids, light straight run naphtha, condensates feedstock may be blended with pentane and isopentane as isolated from gasoline fractions in a refinery environment. It may be desired to separate pentane and isopentane from the said gasoline fractions in order to obtain a gasoline blending stock that can be suited to meet the Reid Vapor Pressure (RVP) specification of motor fuels. Hence, process of the present disclosure using a mesoporous zeolite-based catalyst composition including a mesoporous zeolite-based cracking component and a group 13-based dehydrogenation component can provide conversion of such paraffinic feedstocks with high selectivity, such as pentane and isopentane into propylene. Also a gasoline fraction isolated from the effluent of the present dehydrocracking process can have improved properties with regard to motor octane number and Reid vapor pressure than the gasoline fraction used as feed for this process.

In its active, hydrogen form, MCM-68 can exhibit a relatively high acid activity, with an Alpha Value of about 500 to about 2,000, such as about 600 to about 1,500, such as 700 to about 1,250.

In at least one embodiment, the present dehydrocracking process of a C3-C7 hydrocarbon feedstock using one or more mesoporous zeolite-based catalyst, such as H-meso-zeolite catalyst (e.g., H-meso-MCM-68), and/or one or more mesoporous Group 13-zeolite-based catalyst, such as Ga-meso-zeolite catalyst (e.g., Ga-meso-MCM-68), provides a conversion of a C3-C7 hydrocarbon feedstock to C2-C4 olefins of about 5% to about 25%, with a conversion of from about 5% to about 25% (e.g., 10% conversion). Furthermore, such conversion can be achieved with high selectivity towards propylene, with a selectivity of at least 50%, thus with little to no formation of methane and aromatics (e.g., less than 5 mol % of methane formed during the dehydrocracking process).

The present dehydrocracking process of a C3-C7 hydrocarbon feedstock using one or more mesoporous zeolite-based catalyst, such as H-meso-zeolite catalyst (e.g., H-meso-MCM-68), and/or one or more mesoporous group 13-zeolite-based catalyst, such as Ga-meso-zeolite catalyst (e.g., Ga-meso-MCM-68), can provide a C2-C4 olefin product having a olefin/paraffins molar ratio, such as an olefin/paraffins molar ratio of at least 3, such as about 3 to about 10, such as about 3.5 to about 9.5, such as about 4 to about 9, such as about 4.5 to about 8.5. In at least one embodiment, a dehydrocracking process of n-hexane using Ga-meso-MCM-68 provides an olefin/paraffins molar ratio of about 3.2, such as a propylene to propane (C3=/C3) ratio of about 7.1.

The present dehydrocracking process of a C3-C7 hydrocarbon feedstock using one or more mesoporous zeolite-based catalyst, such as H-meso-zeolite catalyst (e.g., H-meso-MCM-68), and/or one or more mesoporous group 13-zeolite-based catalyst, such as Ga-meso-zeolite catalyst (e.g., Ga-meso-MCM-68), can provide a C2-C4 olefin product having a propylene/ethylene ratio, such as a propylene/ethylene ratio of at least 2, such as about 2 to about 50, such as about 3 to about 25, such as about 4 to about 20, such as about 4.5 to about 15, alternatively from about 2 to about 4. In at least one embodiment, a dehydrocracking process of n-hexane using Ga-meso-MCM-68 provides propylene/ethylene ratio of about 3.7

The stability of the catalyst (e.g., thermostability) can be measured by the evaluation of the loss of the tetrahedral framework aluminum of the said catalyst, or the crystallinity after steaming the said catalyst at higher temperature than the ambient temperature (e.g., 500° C.). Such measurement can be performed for a period of time of from about 30 min to about 100 hours, for example. Accordingly, the loss of tetrahedral framework aluminum can be defined as the difference of the tetrahedral framework aluminum content of the catalyst at higher temperature (e.g., 500° C.) subtracted from the tetrahedral framework aluminum content by nuclear magnetic resonance of the zeolite framework aluminum content (27Al-MAS-NMR). For instance, little to no loss of the tetrahedral framework aluminum content may be observed, such as at higher temperature (e.g., 100 hours at 500° C. in ca. 60% steam balance N2), it is at least 90% of the tetrahedral framework aluminum content value of the catalyst at ambient temperature.

Furthermore, a dehydrocracking process of a C3-C7 hydrocarbon feedstock using one or more mesoporous zeolite-based catalyst, such as H-meso-zeolite catalyst (e.g., H-meso-MCM-68), and/or one or more mesoporous group 13-zeolite-based catalyst, such as Ga-meso-zeolite catalyst (e.g., Ga-meso-MCM-68), can provide a selective conversion to propylene with high resistance to coke formation during the process. For example, the mesoporous zeolite-based catalyst (e.g., Ga-meso-MCM-68) can exhibit a relatively high catalytic dehydrocracking activity/acid activity, with an Alpha Value of about 600 to about 1,500, with high stability with time on stream. Accordingly, the average coke deactivation rate constant of the mesoporous zeolite-based catalyst (e.g., Ga-meso-MCM-68) can be less than 0.1, such as less than 0.08. In comparison, the non-mesoporous catalyst (e.g., Ga-MCM-68), can exhibit an average coke deactivation rate constant of at least 0.3, which indicates a high coke formation in the reactor that can result in rapid catalyst deactivation due to aromatics and/or coke formation in cracking of naphtha, for example. Hence, a long lifetime of the catalyst, being applicable to the dehydrocracking process in a fixed-bed mode, can be achieved due to the catalyst's resistance to coke formation.

In at least one embodiment, catalyst compositions and processes of the present disclosure enable the production of C2-C4 olefins, with high selectivity towards propylene, when the acidic cracking function of the mesoporous H-zeolite is combined with the dehydrogenation function of Ga. Furthermore, the mesopores of the mesoporous zeolite-based catalyst composition (e.g., Ga-meso-MCM-68 catalyst) can exhibit some advantages such as one or more of: i) a deactivation rate of the catalyst by coke formation to a level comparable with the deactivation rate of H-MCM-68 (non-mesoporous acid form of MCM-68 zeolite), while maintaining high propylene selectivity; ii) a low ethylene selectivity, as compared to H-MCM-68 and Ga-MCM-68, which results in a higher propylene/ethylene ratio; iii) a low coke formation, as compared to H-MCM-68 and Ga-MCM-68, which enables longer cycle times before regeneration of the catalyst as compared to dehydrocracking process using H-MCM-68. Hence, the paraffins can be dehydrogenated to hydrogen and olefins, which can be subsequently cracked over the acid sites into smaller olefins (e.g., predominantly propylene). Such hydrogenation of the intermediate fuel olefins can be minimized by fast consecutive conversion of the intermediate olefins via an acid cracking function. The combination of the dehydrogenation function and the acid cracking function can provide non-equilibrium olefin/paraffin molar ratios in the product stream.

EXAMPLES

1. Catalyst Samples

Preparation of H-MCM-68(Example 1)

MCM-68 was synthesized according to the methods described in U.S. Patent Application Publication U.S. Pub. No. 2014/0140921 (application Ser. No. 14/054,038, filed on Oct. 15, 2013), which is incorporated herein by reference. The acid form of the zeolite was prepared by pre-calcining the MCM-68 zeolite at 400° C. under nitrogen flow for 30 minutes, switching the purge gas from nitrogen to air, while increasing the temperature to 600° C., and maintaining the temperature at 600° C. under flowing air for 2 hours. The pre-calcined material was then exchanged three times with NH4NO3 at 98° C. Between each exchange and at the completion of the three exchanges, the MCM-68 zeolite was exhaustively washed with water, and then dried at 120° C. After exchanging the MCM-68 zeolite for the first time, the ammonium form was calcined at 500° C. in air for 2 hours, and then subsequently steamed for 6 hours at 538° C. The steamed MCM-68 zeolite was subsequently exchanged three more times as described previously with the pre-calcined powder. Finally, the ammonium exchanged material was calcined at 500° C. in air for 2 hours to create the acid form of the zeolite, H-MCM-68. The Si/Al molar ratio of H-MCM-68 was about 12.1, as measured by ICP.

Preparation of Ga-MCM-68 (Example 2)

5 grams of H-MCM-68 was impregnated with a solution of 0.31 g of gallium (III) nitrate hydrate (99.9%) in 4 g of deionized water. Afterwards the catalyst was dried for 4 hours at ambient conditions, and then for 16 hours at 121° C. The catalyst was then calcined in air (5 L/min flow rate) at 538° C. for 3 hours, with a 2.5 hours heating ramp. The X-ray fluorescence analysis of the final catalyst revealed 0.9 wt % Ga supported on the catalyst. The Si/Al molar ratio of meso-MCM-68 was 15.6, as measured by X-ray fluorescence.

Preparation of H-meso-MCM-68 (Example 3):
Desilication and Dealumination a) Desilication: Method a (using NaOH): 10 g of H-MCM-68 was heated at 65° C. for 30 minutes in 290 g of a 0.2 M NaOH solution. The solution was quenched with an ice-cold deionized water, filtrated and washed three times with deionized water. The product was dried at 120° C., overnight.

b) Desilication: Method b (using NaOH and TPABr): The desilication procedure was carried out as above with the exception that sodium hydroxide and tetrapropylammonium bromide (TPABr) were dissolved in water to achieve a single solution of both 0.2M NaOH and 0.06M TPABr. 10 g of H-MCM-68 was heated at 65° C. for 30 minutes in 290 g of the solution mixture of 0.2M NaOH and 0.06M TPABr. The solution was quenched with an ice-cold deionized water, filtrated and washed three times with deionized water. The product was dried at 120° C., overnight.

c) Dealumination: The product was then treated with a 0.11 M solution of ethylenediaminetetraacetic acid disodium dihydrate (EDTA) at 100° C., for 6 hours, and isolated by filtration, then washed three times with deionized water. The resulting product was treated by ion exchanged in a 1 M NH4NO3 solution, followed by a washing step with water (three times), resulting in the formation of the H-meso-MCM-68. The H-meso-MCM-68 was recovered by filtration and dried at 120° C. The Si/Al molar ratio of the H-meso-MCM-68 was 8.5, as measured by ICP.

Preparation of Ga-meso-MCM-68 (Example 4)

2.5 g of the H-meso-MCM-68 catalyst previously prepared using desilication Method a (without use of TPABr, as described above) was impregnated with a solution of 0.076 g of Ga(N03)3 in 3.2 g of deionized water. The Ga-meso-MCM-68 catalyst was then dried for 4 hours at ambient temperature, then for 6 hours at 120° C. under air flow, and finally calcined at 538° C. for 3 hours. X-Ray fluorescence analysis revealed 0.51 wt % Ga supported on the catalyst. The Si/Al molar ratio of Ga-meso-MCM-68 was 12.3, as measured by X-Ray fluorescence.

2. Reactor Test

The normal hexane, n-hexane, was employed for reaction test as a model reactant representing paraffinic naphtha feedstock.

Catalysts were tested on the n-hexane conversion at 1,000° F. (538° C.) in a Quartz plug flow reactor, at atmospheric pressure. The test, also known as Alpha test, is described in U.S. Pat. No. 3,354,078, the Journal of Catalysis, Vol. 4, p. 527 (1965), the Journal of Catalysis, Vol. 6, p. 278 (1966), and the Journal of Catalysis, Vol. 61, p. 395 (1980), each are incorporated herein by reference. The catalysts were sized to 14-25 mesh and diluted with Quartz. The feed consisted of a mixture of n-hexane in helium, at a hexane partial pressure of 100 Torr (133 mbar). The WHSV was adjusted to about 200 h-1 and 700 h-1 so as to keep the hexane conversion between 5 and 25%. Four data points were measured at 4 minutes, 11 minutes, 18 minutes, and 25 minutes time on stream. The n-hexane cracking activity, expressed as Alpha, was defined as the first order rate constant for n-hexane conversion relative to a silica-alumina standard, and determined using Formula (A):

$$\alpha = A * \ln(1-X)/\tau \quad (A)$$

where:
  $\alpha$ is the relative first order rate constant
  A includes the reference rate constant and unit conversion=−1.043
  X is the fractional conversion
  $\tau$ is the residence time=wt/($\rho$*F)
  $\rho$ is the packing density in g/cm3
  F is the gas flow rate in cm3/min
  wt is the catalyst weight in g The reported Alpha value was taken after 18 min time of stream. The reaction products methane and C2+ hydrocarbons were analyzed by GC. Aromatics were not analyzed. For the evaluation of the coke resistance of the catalyst in an n-hexane cracking reaction, the Alpha values measured at 4 minutes, 11 minutes, 18 minutes, and 25 minutes were plotted as a function of time, and fitted by an exponential function given in Formula (B):

$$\alpha = \alpha_0 \cdot e^{-ct^{1/3}} \quad (B)$$

where $\alpha 0$ is the Alpha value at time t=0 min and c is the deactivation rate constant.

3. N2-Brunauer-Emmett-Teller (BET)

The N2 isotherm was measured on the H-MCM-68 sample as well as on the mesoporous H-MCM-68 intermediate described above, before the impregnation of Ga. The pore size distribution was calculated from the adsorption and desorption branch of the isotherm using the Barrett-Joyner-Halenda (BJH) method with Halsey Faas correction according to the procedure used in the Micromeritics TriStar II 3020 instrument.

Figure 2:
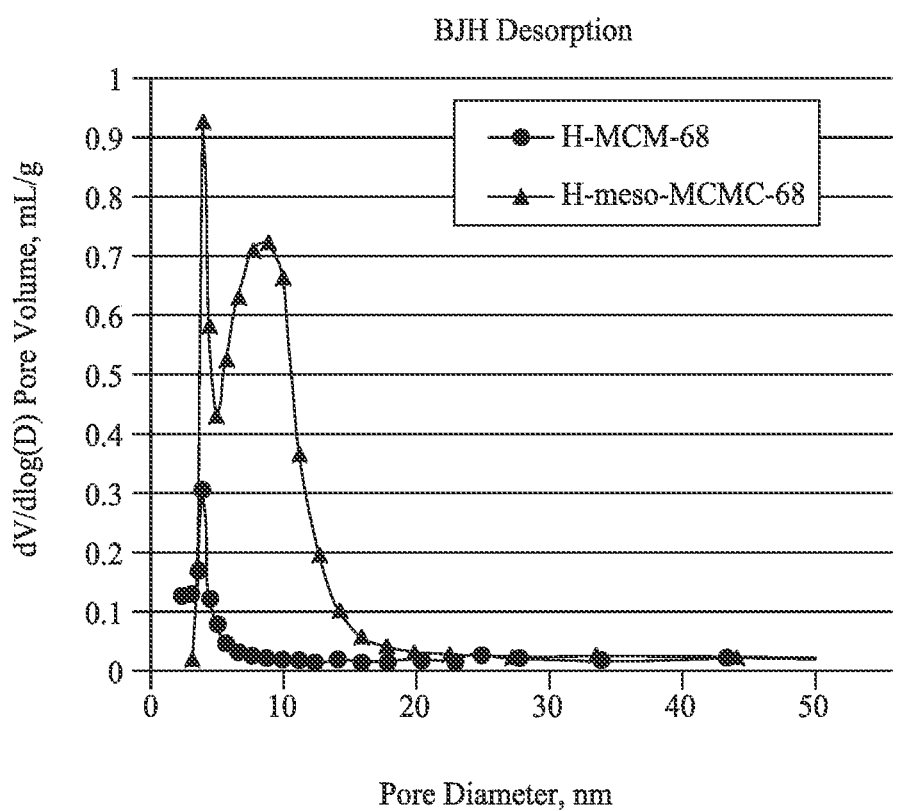
FIG. 2 is a graph illustrating the pore size distribution (Barrett-Joyner-Halenda desorption method) for H-MCM-68 and mesoporous H-MCM-68, according to one embodiment.

As shown in FIG. 1, the N2-BET isotherm measurements of the H-MCM-68 catalyst (Example 1) differed from the N2-BET isotherm measurements of the H-meso-MCM-68 catalyst (Example 3), with formation of a hysteresis loop for H-meso-MCM-68 catalyst (Example 3). The hysteresis loop indicated the formation of mesopores generated by desilication of the H-MCM-68 (Example 1). The pore size distribution shown in FIG. 2 indicated a strong enhancement of the mesopore volume. The total mesopore volume measured in the range from 2.2 nm to 50 nm was 0.071 mL/g for the adsorption and 0.077 mL/g for the desorption branch of the N2 isotherms of H-MCM-68. For meso-H-MCM-68, the total mesopore volume measured in the range from 2.3 nm to 49.5 nm was 0.32 mL/g for the adsorption branch and 0.381 mL/g for the desorption branch. 4. Pore Size Distribution for H-MCM-68 and H-meso-MCM-68 using the Barrett-Joyner-Halenda (BJH) desorption method FIG. 2 illustrates the BJH pores size distribution curves as determined from the desorption branch of the isotherms for H-MCM-68 and H-meso-MCM-68. The pore size distribution was calculated from the desorption branch of the isotherm using the BJH method with Halsey Faas correction. The formation of a hysteresis loop was an indication of the presence of mesopores, which was generated by desilication of the H-zeolite, for example. The pore size distribution of the H-meso-zeolite indicated a strong enhancement of the mesopore volume.

Example 1: Product Selectivity and Olefinicity Over H-MCM-68

Figure 3:
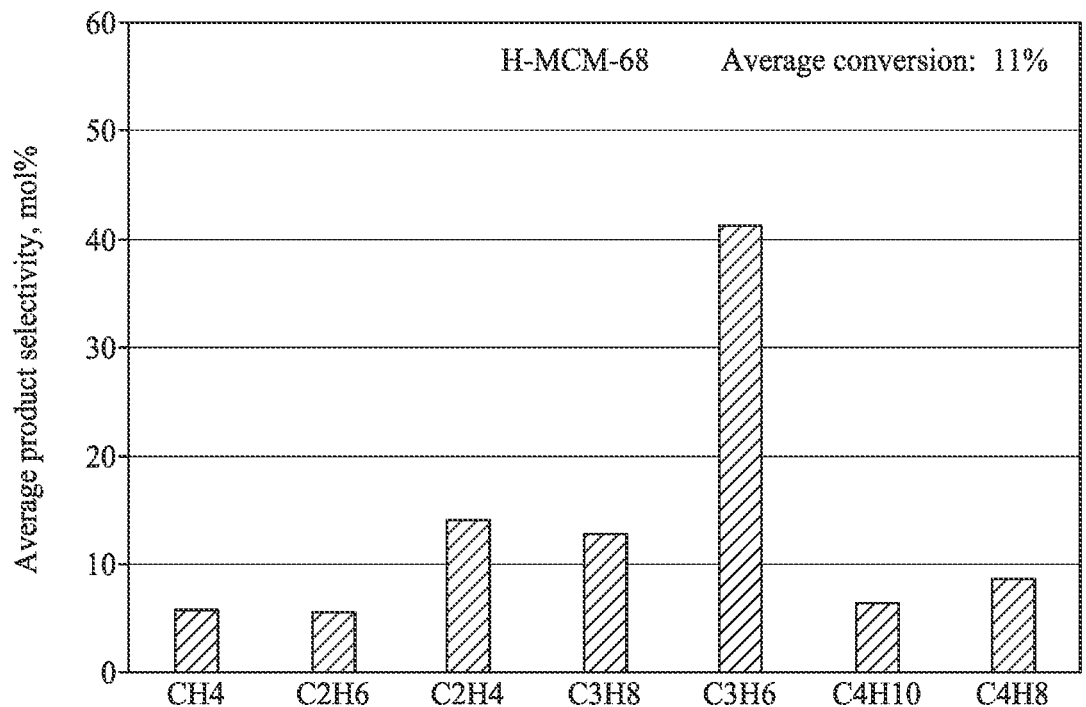
FIG. 3 is a graph illustrating the average product selectivities (in mol %) within paraffinic and olefinic product slate in an n-hexane cracking reaction over H-MCM-68, according to one embodiment.

As shown in FIG. 3, the product selectivities for paraffins and olefins, within the C1-C5 carbon number product, were averaged over six reactor runs. The results indicated the conversion of n-hexane to C1-C4 conversion products from about 5% to 15% conversion. Propylene was obtained as the dominant reaction product with about 40 mol % average selectivity at 11% conversion.

Figure 4:
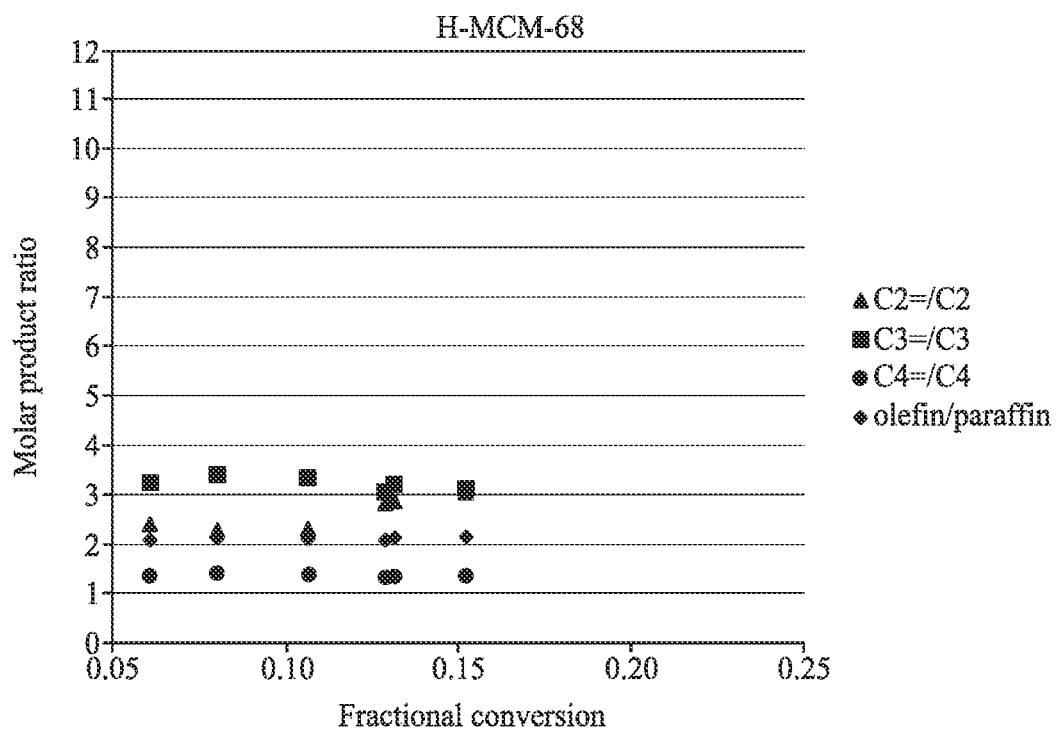
FIG. 4 is a graph illustrating the molar ratios of ethene to ethane (C2=/C2), propylene to propane (C3=/C3), butenes (sum of all butenes) to butanes (sum of all butanes), and total olefin (C2= to C5=) to paraffin (C1 to C5) as a function of conversion in an n-hexane cracking reaction over H-MCM-68, according to one embodiment.

The molar ratios of ethene to ethane (C2=/C2), propylene to propane (C3=/C3), butenes (sum of all butenes) to butanes (sum of all butanes), and total olefin (C2= to C5=) to paraffin (C1 to C5) ratio as a function of conversion (%) in an n-hexane cracking reaction over H-MCM-68 is shown in FIG. 4, indicating the average olefin ratios of 2.6 for C2=/C2, 3.2 for C3=/C3, 1.4 for C4=/C4 and 2.1 for the total olefin/paraffin molar ratio.

Example 1: Coke Deactivation Rate Constant Over H-MCM-68

Figure 5:
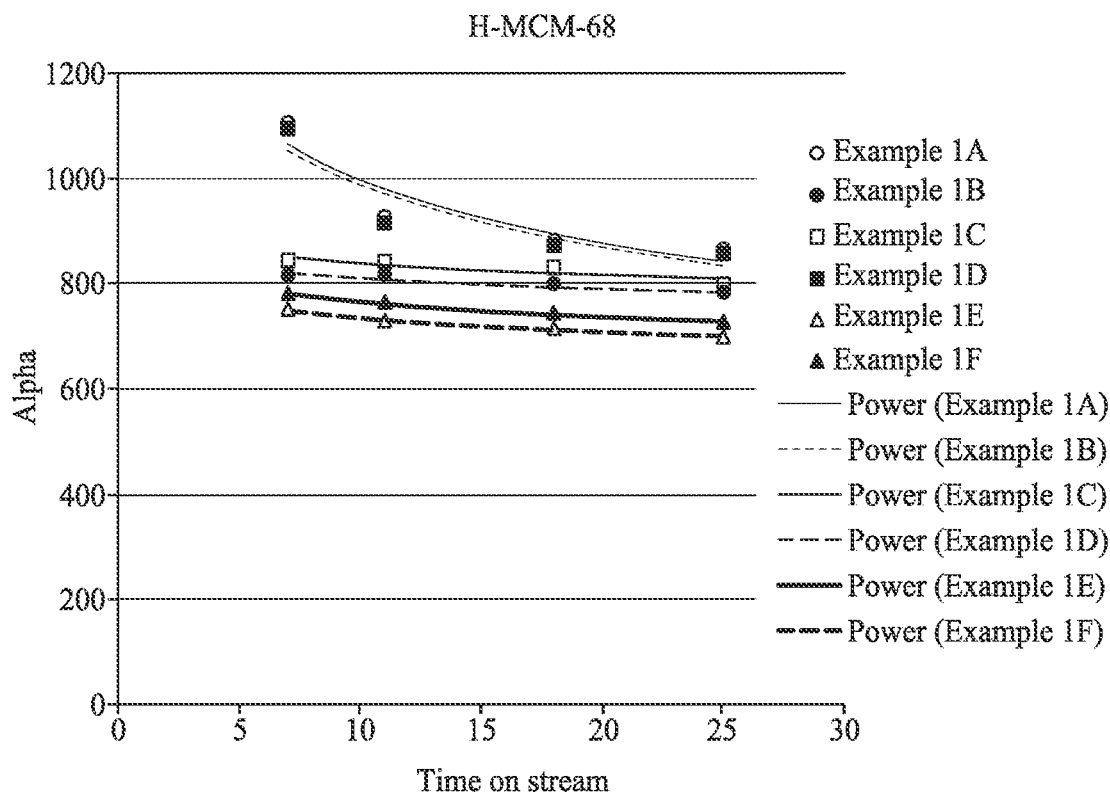
FIG. 5 is a graph illustrating Alpha measurements as a function of time on stream over H-MCM-68 catalysts measured at variable WHSV, according to one embodiment.

Table 1 illustrates the different amounts of H-MCM-68 catalyst (Example 1) introduced to each reactor, with a total of six reactors set up in parallel in the cracking unit. As shown in FIG. 5, which represents the catalyst activity of H-MCM-68 as a function of time on stream measured at variable WHSV, the catalyst activity of H-MCM-68 declined moderately with time on stream. The average coke deactivation rate constant was determined according to Formula (B), and was evaluated to be 0.08 (standard deviation STDEV=0.07). The results obtained in FIG. 5 indicated that the average Alpha value determined after 18 minutes run time was 805 (STDEV=69).

TABLE 1

| GC Analysis of H-MCM-68 (Example 1) | | | | | | |
|---|---|---|---|---|---|---|
| | Example 1A | Example 1B | Example 1C | Example 1D | Example 1E | Example 1F |
| Catalyst Mass (mg) | 4.8 | 7.2 | 9.1 | 10.9 | 13.1 | 15.1 |

Example 2: Product Selectivity and Olefinicity Over Ga-MCM-68

Figure 6:
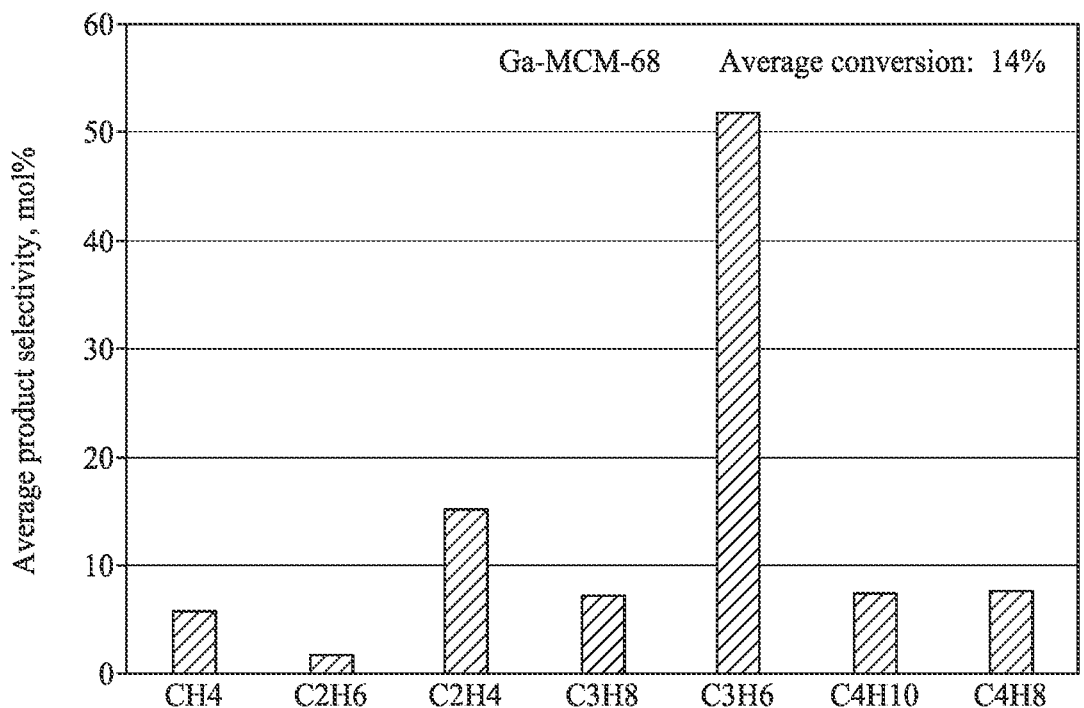
FIG. 6 is a graph illustrating the average product selectivities (mol %) within paraffinic and olefinic product slates in an n-hexane cracking reaction over Ga-MCM-68, according to one embodiment.

FIG. 6 shows the product selectivities for paraffins and olefins within the C1-C5 carbon number product slate in an n-hexane cracking reaction over Ga-MCM-68 (Example 2). Selectivities were averaged over four reactor runs, with the conversions ranging from about 5% to about 25%. The average conversion across these reactor runs was 14%. As shown in FIG. 6, the propylene selectivity increased from 40% to 50% due to the effect of Ga promotion of H-MCM-68.

Figure 7:
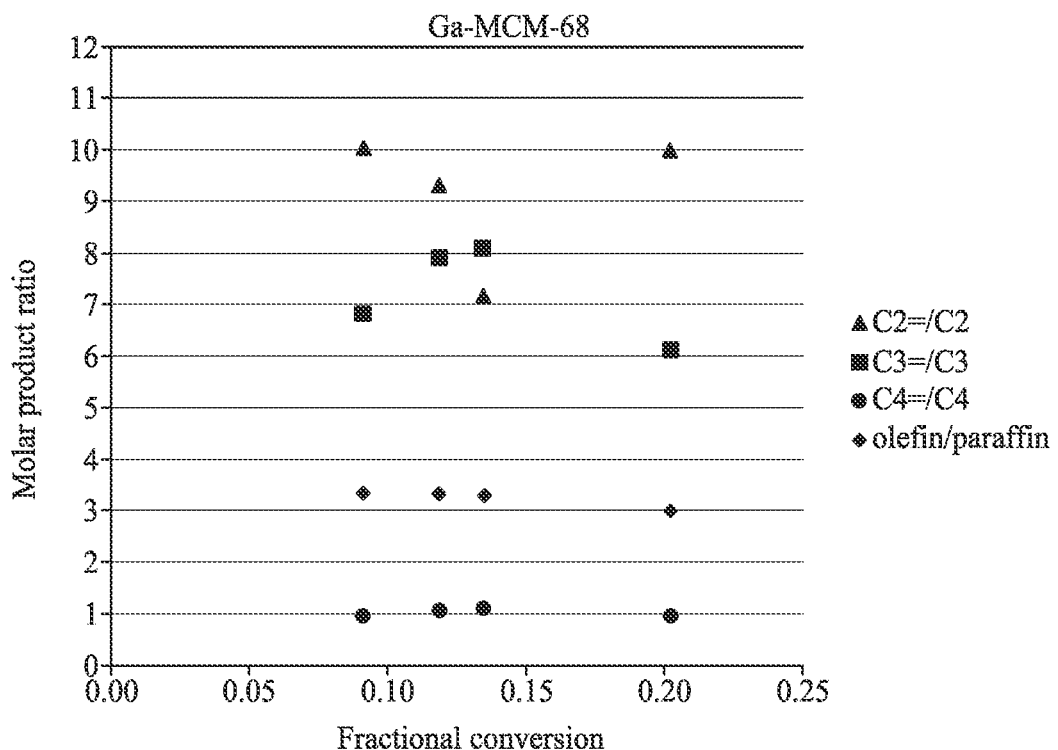
FIG. 7 is a graph illustrating the molar ratios of ethene to ethane (C2=/C2), propylene to propane (C3=/C3), butenes (sum of all butenes) to butanes (sum of all butanes), and total olefin (C2= to C5=) to paraffin (C1 to C5) as a function of conversion in an n-hexane cracking reaction over Ga-MCM-68, according to one embodiment.

The molar ratios of ethene to ethane (C2=/C2), propylene to propane (C3=/C3), butenes (sum of all butenes) to butanes (sum of all butanes), and total olefin (C2= to C5=) to paraffin (C1 to C5) ratio as a function of conversion (%) in an n-hexane cracking reaction over Ga-MCM-68 is shown in FIG. 7, indicating average olefin ratios of 9.1 for C2=/C2, 7.2 for C3=/C3, 1.0 for C4=/C4 and 3.2 for the total olefin/paraffin molar ratio. It is apparent that the modification of H-MCM-68 with Ga led to a significant increase in the C2=/C2 and C3=/C3 ratios, thus resulting in an increased total olefinicity.

Example 2: Coke Deactivation Rate Constant Over Ga-MCM-68

Figure 8:
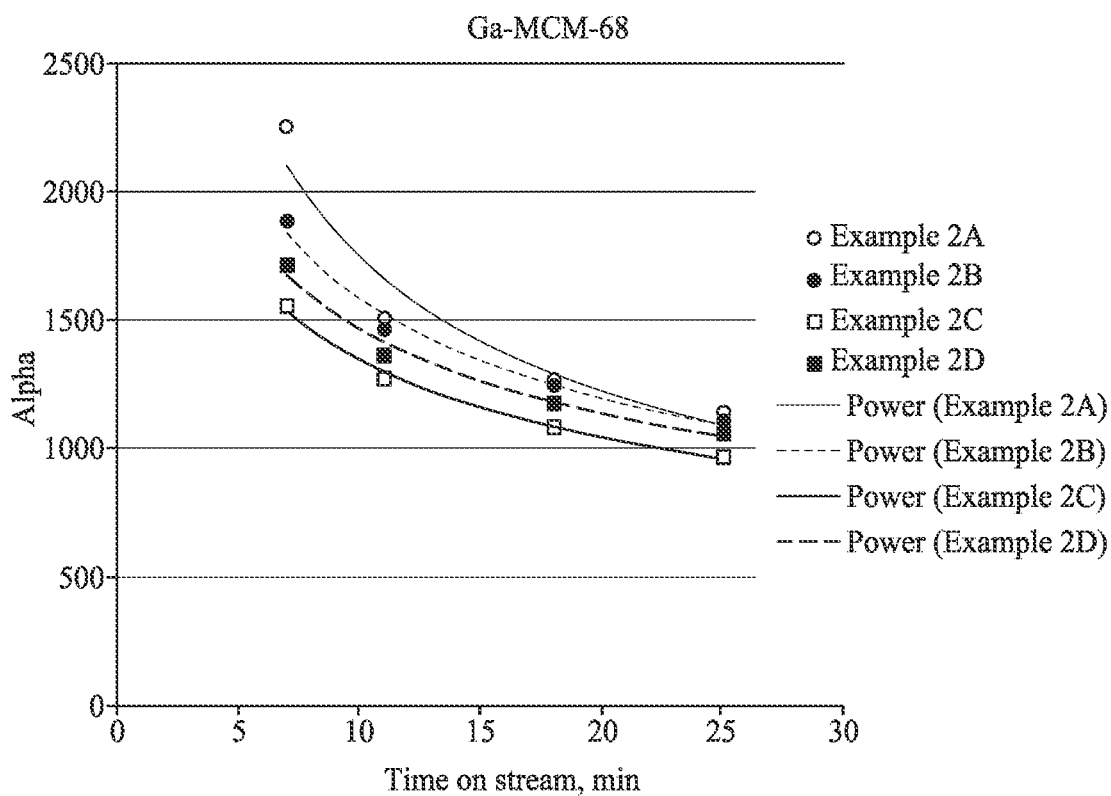
FIG. 8 is a graph illustrating the Alpha measurements as a function of time on stream over Ga-MCM-68 catalysts measured at variable WHSV, according to one embodiment.

Table 2 illustrates the different amounts of Ga-MCM-68 catalyst (Example 2) introduced to each reactor, with a total of four reactors set up in parallel in the Alpha cracking unit. FIG. 8 shows the catalyst activity of Ga-MCM-68 (Example 2) as a function of time on stream over Ga-MCM-68 catalysts (Examples 2A, 2B, 2C, and 2D) measured at variable WHSV. The catalyst activity declined more strongly over Ga-MCM-68 (Example 2) when compared to the unmodified reference catalyst H-MCM-68 (Example 1) with time on stream. The average coke deactivation rate constant was determined to be 0.32 (STDEV=0.06). The average Alpha value determined after 18 min run time was 1190 (STDEV=83). The stronger decline in n-hexane dehydrocracking activity with time is in line with the higher initial activity of the Ga-MCM-68 catalyst. In addition, Ga-MCM-68 (Example 2) has a higher Alpha than the H-MCM-68 (Example 1).

TABLE 2

| GC Analysis of Ga-MCM-68 (Example 2) | | | | |
|---|---|---|---|---|
| | Example 2A | Example 2B | Example 2C | Example 2D |
| Catalyst Mass (mg) | 5.1 | 6.9 | 9 | 13.2 |

Example 4: Product Selectivity and Olefinicity Over Ga-Meso-MCM-68

Figure 9:
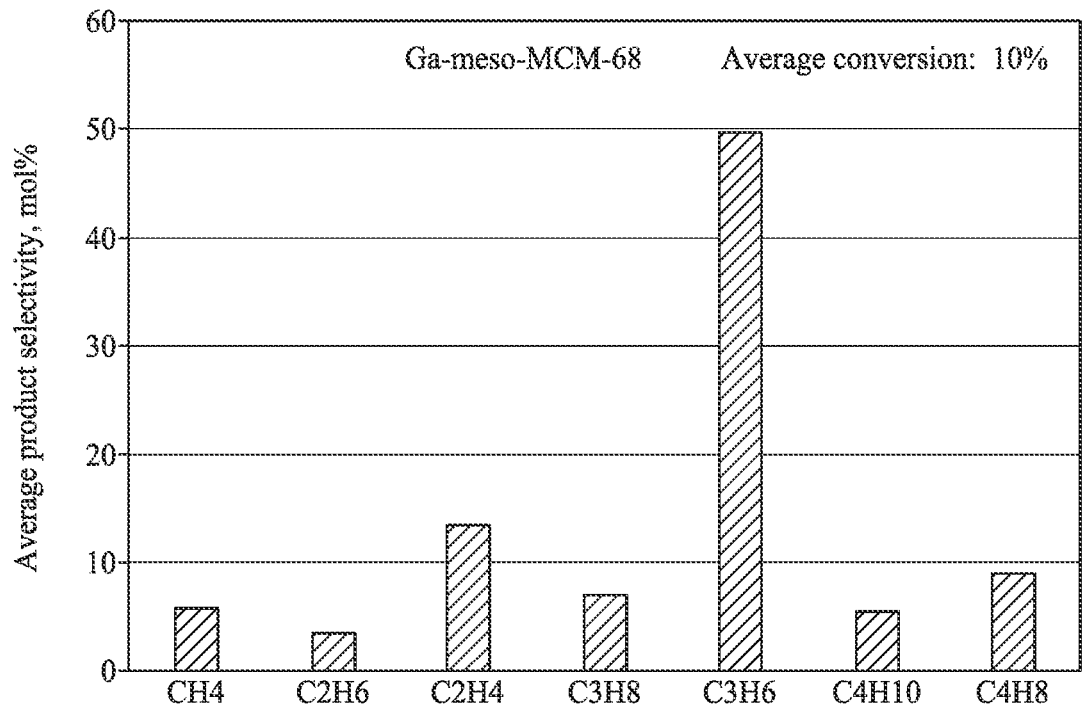
FIG. 9 is a graph illustrating the average product selectivities (mol %) within paraffinic and olefinic product slate in an n-hexane cracking reaction over Ga-meso-MCM-68, according to one embodiment.

FIG. 9 shows the product selectivities for paraffins and olefins within the C1-C5 carbon number product slate in an n-hexane cracking reaction over Ga-meso-MCM-68 (Example 4). Table 3. illustrates the different amount of Ga-meso-MCM-68 catalyst (Example 4) introduced to each reactor, with a total of six reactors set up in parallel in the Alpha cracking unit. Selectivities are averaged over the six reactor runs, with the conversions ranging from about 5% to about 15%, with an average conversion of 10%. The product distribution resembles much that of Ga-MCM-68 with propylene being the main reaction product (about 50% selectivity). Advantageously, only 5 mol % of methane was produced during the process.

TABLE 3

| GC Analysis of Ga-meso-MCM-68 (Example 4) | | | | | |
|---|---|---|---|---|---|
| Example 4A | Example 4B | Example 4C | Example 4D | Example 4E | Example 4F |
| Catalyst Mass (mg) 5.4 | 7.1 | 9.1 | 10.9 | 13.3 | 15.1 |

Figure 10:
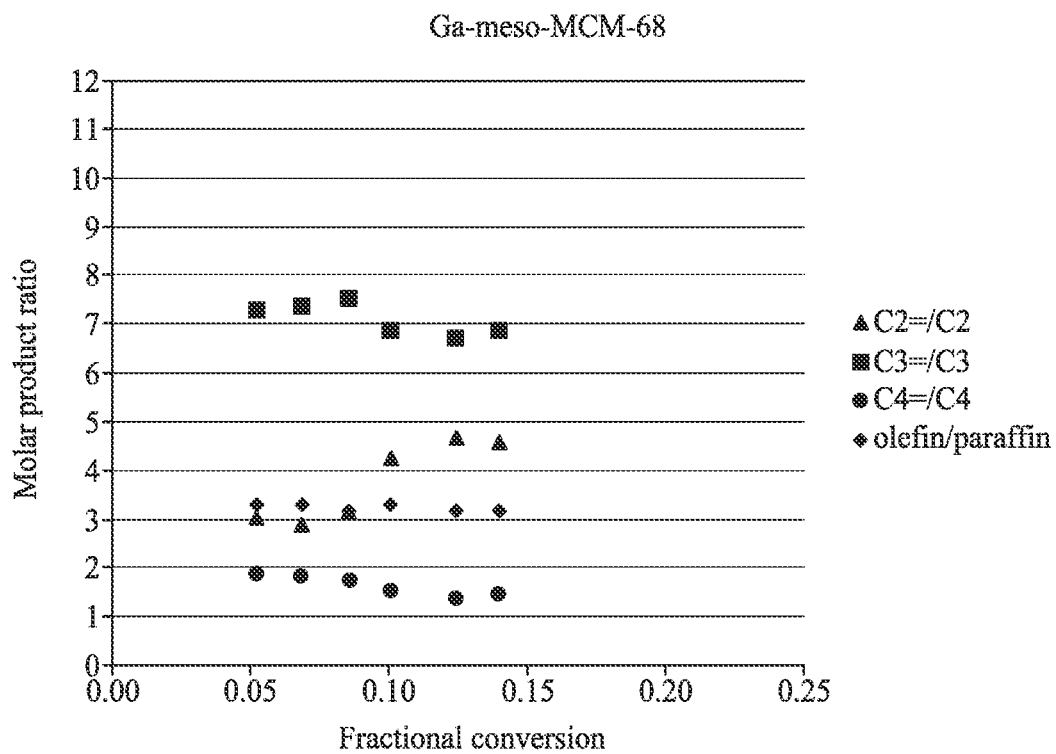
FIG. 10 is a graph illustrating the molar ratios of ethene to ethane (C2=/C2), propylene to propane (C3=/C3), butenes (sum of all butenes) to butanes (sum of all butanes), and total olefin (C2= to C5=) to paraffin (C1 to C5) as a function of conversion in an n-hexane cracking reaction over Ga-meso-MCM-68, according to one embodiment.

As shown in FIG. 10, the molar ratios of ethene to ethane (C2=/C2), propylene to propane (C3=/C3), butenes (sum of all butenes) to butanes (sum of all butanes), and total olefin (C2= to C5=) to paraffin (C1 to C5) ratio as a function of conversion in an n-hexane cracking reaction over Ga-meso-MCM-68 (Example 4) were obtained, with average olefin ratios of 3.8 for C2=/C2, 7.1 for C3=/C3, 1.6 for C4=/C4, and 3.2 for the total olefin/paraffin molar ratio. The Ga-meso-MCM-68 catalyst (Example 4) maintained the same favorable C3=/C3 ratio and total olefinicity as Ga-MCM-68 (Example 2). Ga-meso-MCM-68 provided lower C2=/C2 ratio than Ga-MCM-68. Advantageously, a high olefin/paraffins molar ratio was obtained. Without being bound by theory, the faster the reaction conversion of n-hexane to propylene, the more unlikely the hexene will be hydrogenated. Hence, the hexene is removed out of the equilibrium and propylene is formed rapidly.

Example 4: Coke Deactivation Rate Constant Over Ga-Meso-MCM-68

Figure 11:
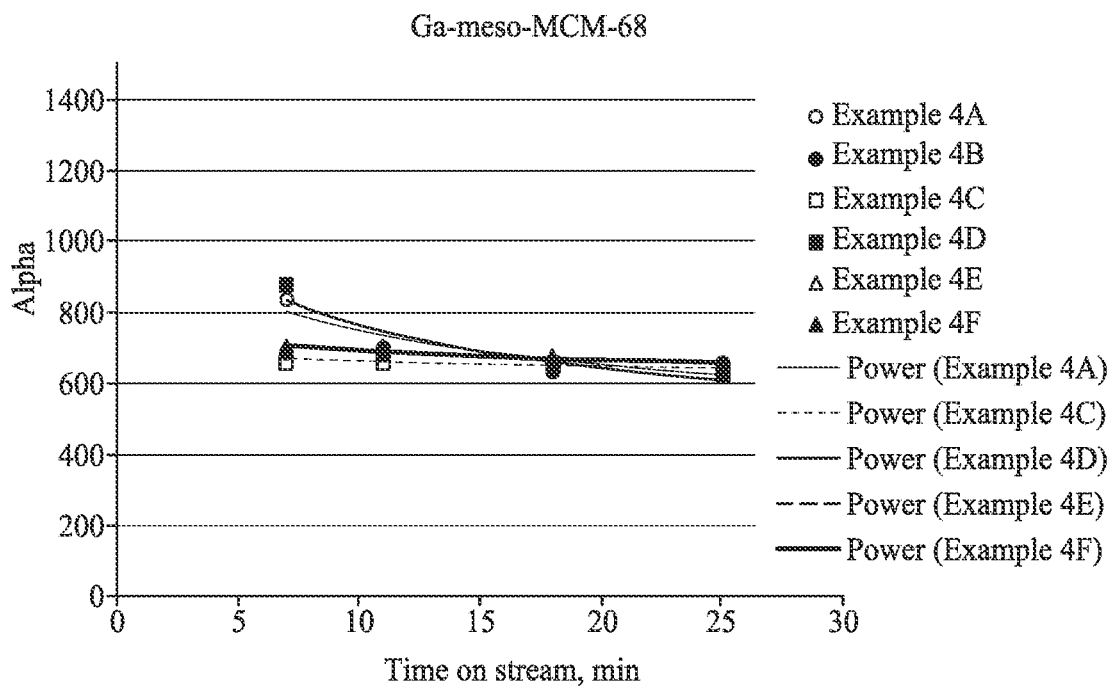
FIG. 11 is a graph illustrating the Alpha measurements as a function of time on stream over Ga-meso-MCM-68 catalysts measured at variable WHSV, according to one embodiment.

FIG. 11 shows the catalyst activity (Alpha) as a function of time on stream over Ga-meso-MCM-68 catalysts measured at variable WHSV. The activity of the catalyst Ga-meso-MCM-68 (Example 4) was stable with time on stream compared to Ga-MCM-68 (Example 2). The average coke deactivation rate constant was determined to be 0.08 (STDEV=0.07). The average Alpha value determined after 18 min run time was 659 (STDEV=17).

Figure 12:
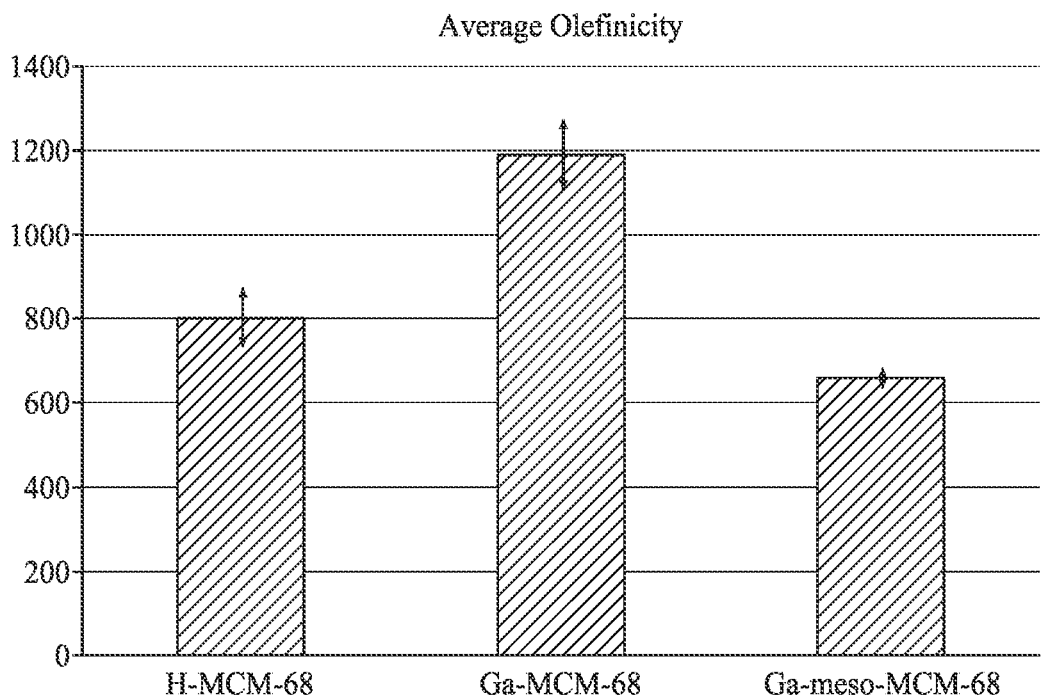
FIG. 12 is a graph illustrating the average Alpha values and their standard deviation in an n-hexane cracking reaction over H-MCM-68, Ga-MCM-68, and Ga-meso-MCM-68 catalysts, according to one embodiment.

FIG. 12 shows the average Alpha values and their standard deviation in an n-hexane cracking reaction over H-MCM-68 (Example 1), Ga-MCM-68 (Example 2), and Ga-meso-MCM-68 (Example 4) catalysts. Results demonstrate that H-MCM-68 and Ga-MCM-68 can exhibit a relatively high hexane cracking activity, with an Alpha Value of about 800 to about 1,200. When MCM-68 zeolite is converted to its active, acidic H-form by calcination, the H-MCM 68 becomes highly acidic. When H-MCM-68 is further converted to Ga-MCM-68 via impregnation with a solution of gallium (III) nitrate, Ga(N03)3, conversion of hexane can occur both by direct cracking over Brönsted acid sites as well as by dehydrogenation over Ga sites. When H-MCM-68 is further converted to H-meso-MCM-68, followed by impregnation with Ga(N03)3, to form the corresponding Ga-meso-MCM-68 catalyst, the hexane cracking activity was decreased.

Figure 13:
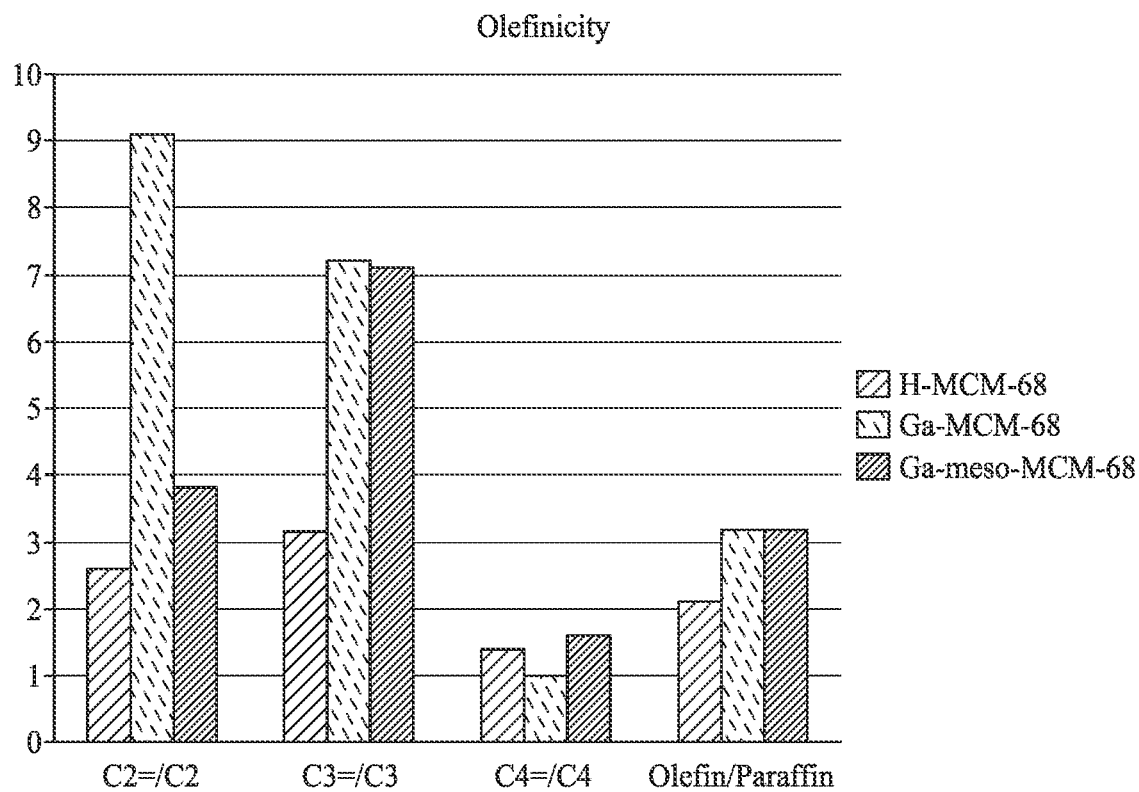
FIG. 13 is a graph illustrating the average molar ratios of ethene to ethane (C2=/C2), propylene to propane (C3=/C3), butenes (sum of all butenes) to butanes (sum of all butanes), and total olefin (C2= to C5=) to paraffin (C1 to C5) at variable WHSV in an n-hexane cracking reaction, according to one embodiment.

As shown in FIG. 13, the average molar ratios of ethene to ethane (C2=/C2), propylene to propane (C3=/C3), butenes (sum of all butenes) to butanes (sum of all butanes), and total olefin (C2= to C5=) to paraffin (C1 to C5) ratio at variable WHSV in an n-hexane cracking reaction for Ga-meso-MCM-68 confirm the high selectivity towards propylene, when compared to H-MCM-68 and Ga-MCM-68.

Figure 14:
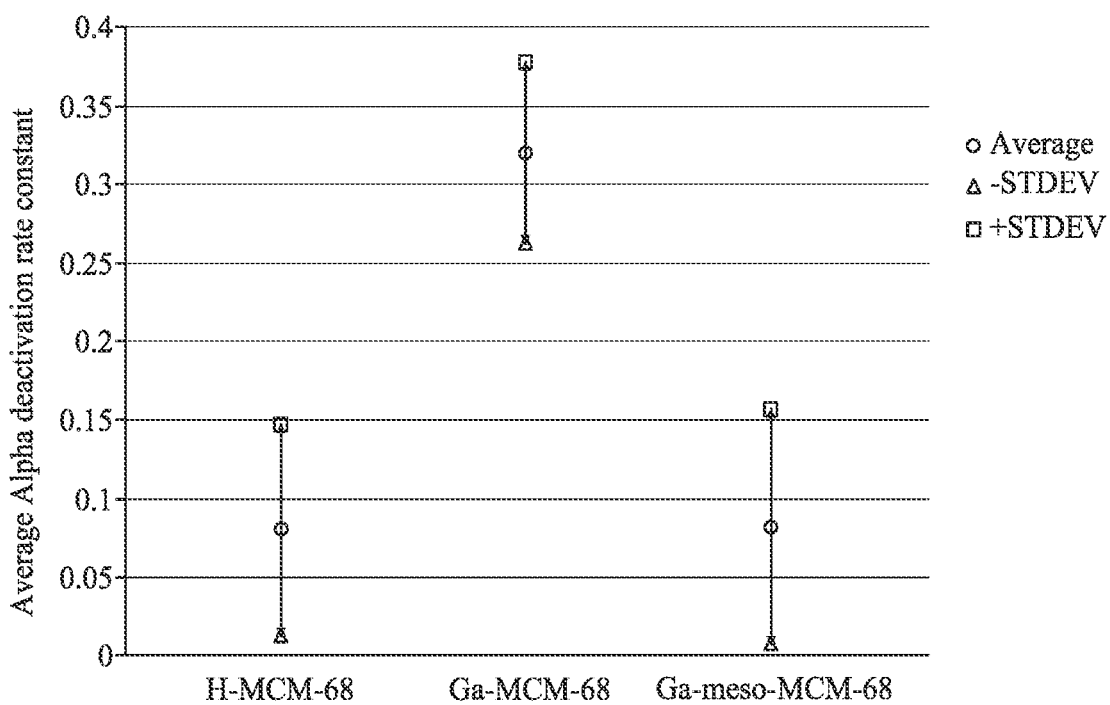
FIG. 14 is a graph illustrating the average coke deactivation rate constants and their standard deviation in an n-hexane cracking test of H-MCM-68, Ga-MCM-68, and Ga-meso-MCM-68, according to one embodiment.

FIG. 14 shows the average coke deactivation rate constants of H-MCM-68, Ga-MCM-68, and Ga-meso-MCM-68, as well as their standard deviation in the n-hexane cracking test. Statistically, H-MCM-68 and Ga-meso-MCM-68 exhibit the same coke deactivation behavior, whereas Ga-MCM-68 exhibits a significant Alpha deactivation rate constant (significant increase of coke formation). The results confirm that the presence of mesopores in the catalyst composition is beneficial for preventing any coke formation during the dehydrocracking process.

Hence, results illustrated in FIGS. 1 to 14 demonstrated that the upgrading H-MCM-68 (Example 1) with the dehydrogenation function provided by Ga led to the significant increase of the conversion of n-hexane, as well as the marked increase of the selectivity towards propylene. The addition of Ga to the non-mesoporous zeolite (H-MCM-68) accelerated the coke formation. However, the introduction of the mesopores to Ga-MCM-68 reduced the deactivation rate of coke formation to a level comparable with the H-MCM-68, while maintaining the favorably high propylene selectivity. An additional advantage of the mesoporous Ga-meso-MCM-68 catalyst was its lower ethylene selectivity which resulted in a higher propylene/ethylene ratio.

Typical naphtha steam cracking yields about 15% methane, 30% ethylene, and about 16% propylene (reference: Handbook of Petrochemicals Production Processes, edited by Robert A. Meyers, McGraw-Hill Professional Publishing, 2005, table 6.1.1). Light olefin yields are high but more ethylene than propylene is produced. In addition, a relatively large amount of methane is produced by steam cracking.

Overall, compositions and processes of the present disclosure can provide mesoporous zeolite-based catalyst compositions including a zeolite with an acid-based cracking function and a group 13 atom-based dehydrogenation function. Dehydrocracking processes of the present disclosure can provide conversion of C3-C7 hydrocarbon feedstocks to small olefins (e.g., propylene) for fuel upgrading. Compositions and processes of the present disclosure may provide reduced or eliminated formation of methane, propane and/or aromatics, while reducing the deactivation rate of the catalyst by coke formation to a level comparable with the non-mesoporous acid zeolites, while maintaining high propylene selectivity. Suppressing the coke formation enables longer cycle times before regeneration of the catalyst.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

What is claimed is:

1. A catalyst compound comprising:
a mesoporous zeolite having a structural type selected from MFI and MSE, or a combination thereof, a silicon to aluminum molar ratio (Si/Al ratio) of from about 7.5 to about 20 as measured by X-ray fluorescence and a total mesopore volume of 0.1 mL/g to 0.8 mL/g as measured by BET surface adsorption, wherein the mesoporous zeolite is impregnated with a transition metal selected from one or more of Ga, In, and TI or mixture thereof.

2. The catalyst compound of claim 1, wherein the mesoporous zeolite has an average coke deactivation constant comparable to a non-mesoporous acid form of the zeolite.

3. The catalyst compound of claim 1, wherein the mesoporous zeolite has a plurality of 12-membered rings.

4. The catalyst compound of claim 1, wherein the mesoporous zeolite a total mesopore volume of 0.42 mL/g to 0.71 mL/g as measured by BET surface adsorption.

5. The catalyst compound of claim 1, wherein the mesoporous zeolite has a hexane sorption capacity at 75 Torr, and 90° C., of about 5 wt % to about 15 wt %, based on the total weight of the catalyst compound.

6. A mesoporous zeolite-based catalyst composition comprising a catalyst compound of claim 1, wherein the mesoporous zeolite-based catalyst composition is selective for propylene in a combined acidic cracking and dehydrogenation process.

7. The mesoporous zeolite-based catalyst composition of claim 6, wherein the mesoporous zeolite-based catalyst composition yields a propylene selectivity in a cracking reaction of about 50 mol % or greater.

8. The mesoporous zeolite-based catalyst composition of claim 6, wherein the transition metal is disposed on the mesoporous zeolite.

9. The mesoporous zeolite-based catalyst composition of claim 6, wherein the transition metal is disposed within the mesoporous zeolite.

10. The mesoporous zeolite-based catalyst composition of claim 6, wherein the acid form zeolite content is from about 20 wt % to about 99.99 wt % of the weight of the mesoporous zeolite-based catalyst composition.

11. The mesoporous zeolite-based catalyst composition of claim 6, wherein the transition metal content is from about 0.01 wt % to about 20 wt % of the weight of the mesoporous zeolite-based catalyst composition and configured to produce a fractional conversion between 0.10 to 0.20 with average olefin paraffin molar ratio of at least 3.0 in a cracking reaction.

12. The mesoporous zeolite-based catalyst composition of claim 6, wherein the mesoporous zeolite has a Si/Al molar ratio of about 10 to about 15.

13. The mesoporous zeolite-based catalyst composition of claim 6, wherein the mesoporous zeolite-based catalyst composition has a hexane sorption capacity of about 40 mg/g to about 150 mg/g, at a pressure of 75 Torr, and a temperature of 90° C.

14. The mesoporous zeolite-based catalyst composition of claim 6, wherein the zeolite is a mesoporous MCM-68.

15. The mesoporous zeolite-based catalyst composition of claim 6, wherein the catalyst composition has a n-hexane sorption capacity of 40 mg/g to 150 mg/g, at a pressure of 75 Torr, and a temperature of 90° C.

* * * * *